US012586429B2

(12) United States Patent
Ohnishi et al.

(10) Patent No.: US 12,586,429 B2
(45) Date of Patent: Mar. 24, 2026

(54) FUSION SPLICING SYSTEM, OPERATION CONTROL METHOD FOR FUSION SPLICER, AND SERVER

(71) Applicant: Sumitomo Electric Optifrontier Co., Ltd., Yokohama (JP)

(72) Inventors: Takaharu Ohnishi, Yokohama (JP); Kazuyoshi Ooki, Yokohama (JP); Takahiro Suzuki, Yokohama (JP)

(73) Assignee: Sumitomo Electric Optifrontier Co., Ltd., Yokohama (JP)

( * ) Notice: Subject to any disclaimer, the term of this patent is extended or adjusted under 35 U.S.C. 154(b) by 137 days.

(21) Appl. No.: 18/553,851

(22) PCT Filed: Apr. 6, 2021

(86) PCT No.: PCT/JP2021/014661

§ 371 (c)(1),
(2) Date: Oct. 4, 2023

(87) PCT Pub. No.: WO2022/215175

PCT Pub. Date: Oct. 13, 2022

(65) Prior Publication Data

US 2024/0185656 A1 Jun. 6, 2024

(51) Int. Cl.
*G07C 9/00* (2020.01)

(52) U.S. Cl.
CPC ................................ *G07C 9/00309* (2013.01)

(58) Field of Classification Search
CPC .... G07C 9/00309; G08B 13/14; G08B 13/22; G06F 21/88; G06F 21/31; G02B 6/2551; G02B 6/2553; G02B 6/255; H04W 12/06
(Continued)

(56) References Cited

U.S. PATENT DOCUMENTS

| | | | | |
|---|---|---|---|---|
| 5,717,813 A * | 2/1998 | Harman | ............... | G02B 6/2551 385/147 |
| 7,690,850 B2 * | 4/2010 | Kossat | ................. | G02B 6/2551 219/121.45 |

(Continued)

FOREIGN PATENT DOCUMENTS

| | | |
|---|---|---|
| EP | 3644292 A1 | 4/2020 |
| EP | 3651135 A1 | 5/2020 |

(Continued)

OTHER PUBLICATIONS

International Search Report issued in Patent Application No. PCT/JP2021/014661 dated Jun. 29, 2021.

(Continued)

*Primary Examiner* — Nam V Nguyen
(74) *Attorney, Agent, or Firm* — McDonald Hopkins LLC

(57) ABSTRACT

A fusion splicing system includes a fusion splicer including a fusion mechanism to fusion-splice optical fibers, and a control unit configured to control an operation of the fusion mechanism, a first information terminal capable of communicating with the fusion splicer, and a server capable of communicating with the first information terminal. The control unit is configured to set locking on an operation of the fusion mechanism before use. The first information terminal acquires locking release information to temporarily release the locking setting from the server, and transmits a locking release command signal including the locking release information to the fusion splicer. The control unit determines whether or not the locking release information included in the received locking release command signal is appropriate, and temporarily releases the locking setting on the fusion mechanism to enable the fusion mechanism when the locking release information is appropriate.

19 Claims, 20 Drawing Sheets

(58) Field of Classification Search
USPC ................ 340/5.2, 5.21, 5.27, 5.28; 385/134
See application file for complete search history.

(56) References Cited

U.S. PATENT DOCUMENTS

| | | | | |
|---|---|---|---|---|
| 9,513,438 | B2 * | 12/2016 | Lloyd | G02B 6/2557 |
| 11,110,890 | B2 * | 9/2021 | Lutterbeck | B60R 25/23 |
| 11,288,938 | B2 * | 3/2022 | Ooki | H04W 12/06 |
| 11,454,761 | B2 * | 9/2022 | Suzuki | H04L 67/12 |
| 12,227,968 | B2 * | 2/2025 | Lv | G07C 9/0069 |
| 2005/0238298 | A1 | 10/2005 | Roark et al. | |
| 2020/0134997 | A1 | 4/2020 | Ooki et al. | |
| 2020/0341196 | A1 | 10/2020 | Ooki et al. | |
| 2020/0341197 | A1 | 10/2020 | Suzuki et al. | |
| 2022/0078534 | A1 | 3/2022 | Suzuki et al. | |

FOREIGN PATENT DOCUMENTS

| | | | |
|---|---|---|---|
| JP | 2005-146755 | A | 6/2005 |
| JP | 2017-224076 | A | 12/2017 |
| WO | 2013/078561 | A1 | 6/2013 |
| WO | 2019/009371 | A1 | 1/2019 |
| WO | 2019/124218 | A1 | 6/2019 |
| WO | 2019/142652 | A1 | 7/2019 |
| WO | 2020/138093 | A1 | 7/2020 |

OTHER PUBLICATIONS

Written Opinion issued in Patent Application No. PCT/JP2021/014661 dated Jun. 29, 2021.

* cited by examiner

*Fig.18*

| ADMINISTRATOR | WORKER | TEAM |
|---|---|---|
| A | T1 | A, B |
| | T2 | A |
| | T3 | A |
| | T4 | B |
| | T5 | B |
| | T6 | C |
| | T7 | C |
| | T8 | C |

Fig.19

| SERIAL NUMBER OF FUSION SPLICER | LOCK PASSWORD | ADMINIS-TRATOR | TIME ZONE | USE PERIOD | LOCK CYCLE | USER |
|---|---|---|---|---|---|---|
| 74X000000001 | 123456 | A | GMT+01:00 | 2021/04/01~2021/04/20 | EVERY RESTART | T1, T2, T3 |
| 74X000000002 | 123457 | A | GMT+01:00 | 2021/04/01~2021/04/20 | EVERY RESTART | T1, T2, T3 |
| 74X000000003 | 123458 | A | GMT+01:00 | 2021/04/01~2021/04/20 | DAILY | T1 T4, T5 |
| 74X000000004 | 123459 | A | GMT+01:00 | 2021/04/01~2021/04/20 | DAILY | T1, T4, T5 |
| 74X000000005 | 123460 | A | GMT+01:00 | 2021/04/01~2021/04/20 | WEEKLY | T6, T7, T8 |
| 74X000000006 | 123461 | A | GMT+01:00 | 2021/04/01~2021/04/20 | WEEKLY | T6, T7, T8 |
| 74X000000007 | 123462 | A | GMT+01:00 | 2021/04/01~2021/05/30 | MONTHLY | T6, T7, T8 |
| 74X000000008 | 123463 | A | GMT+01:00 | 2021/04/01~2021/05/30 | MONTHLY | T6, T7, T8 |

FUSION SPLICING SYSTEM, OPERATION CONTROL METHOD FOR FUSION SPLICER, AND SERVER

TECHNICAL FIELD

The present disclosure relates to a fusion splicing system, an operation control method for a fusion splicer, and a server.

BACKGROUND ART

Patent Literature 1 discloses a theft detection system and a theft detection method for detecting theft of a fusion splicer.

CITATION LIST

Patent Literature

[Patent Literature 1] Japanese Unexamined Patent Publication No. 2017-224076

SUMMARY OF INVENTION

A fusion splicing system of the present disclosure includes a fusion splicer including a fusion mechanism configured to fusion-splice optical fibers, and a control unit including a communication unit to communicate with an external device, the control unit being configured to control an operation of the fusion mechanism; a first information terminal capable of communicating with the fusion splicer; and a server capable of communicating with the first information terminal. The control unit of the fusion splicer is configured to be able to set locking on an operation of the fusion mechanism before use. The first information terminal acquires locking release information to temporarily release the locking setting from the server, and transmits a locking release command signal including the locking release information to the fusion splicer. The control unit of the fusion splicer determines whether or not the locking release information included in the received locking release command signal is appropriate, and temporarily releases the locking setting on the fusion mechanism so as to enable the fusion mechanism when the locking release information is appropriate.

An operation control method for a fusion splicer of the present disclosure is an operation control method for controlling an operation of a fusion splicer including a fusion mechanism configured to fusion-splice optical fibers, and a control unit including a communication unit to communicate with an external device, the control unit being configured to control an operation of the fusion mechanism, by a first information terminal capable of communicating with the fusion splicer. This operation control method includes acquiring, with the first information terminal, locking release information to release the locking setting on the fusion splicer, the locking on an operation of the fusion mechanism being set in the fusion splicer, from a server; transmitting, with the first information terminal, a locking release command signal including the locking release information acquired from the server to the fusion splicer; and determining, with the control unit, whether or not the locking release information included in the received locking release command signal is appropriate. The locking setting by the control unit is released and the fusion mechanism is temporarily enabled when the locking release information is determined to be appropriate in the determining.

A server of the present disclosure includes a storage unit configured to store identification information of a plurality of fusion splicers, locking release information to release locking setting on an operation of each of the plurality of fusion splicers, and information on a worker who is able to request release of the locking setting on each of the plurality of fusion splicers in association with one another; a communication unit configured to receive, from an external information terminal, a request for acquisition of locking release information of at least one of the plurality of fusion splicers; and a determination unit configured to determine whether or not the worker information included in the received acquisition request matches worker information associated with the fusion splicer for which the locking release information stored in the storage unit is requested. When the determination unit determines that the worker information included in the received acquisition request matches the stored worker information, the communication unit transmits locking release information associated with the fusion splicer to the external information terminal.

BRIEF DESCRIPTION OF DRAWINGS

FIG. 18 is a diagram illustrating an example of the administrator information, the worker information, and team information registered in the server in association with one another.

FIG. 19 is a diagram illustrating an example of identification information (serial number) of each fusion splicer, a release password of a locking setting of each fusion splicer, administrator information, time zone, use period, lock cycle, and available worker information, which are registered in the server in association with one another.

DESCRIPTION OF EMBODIMENTS

Figure 1:
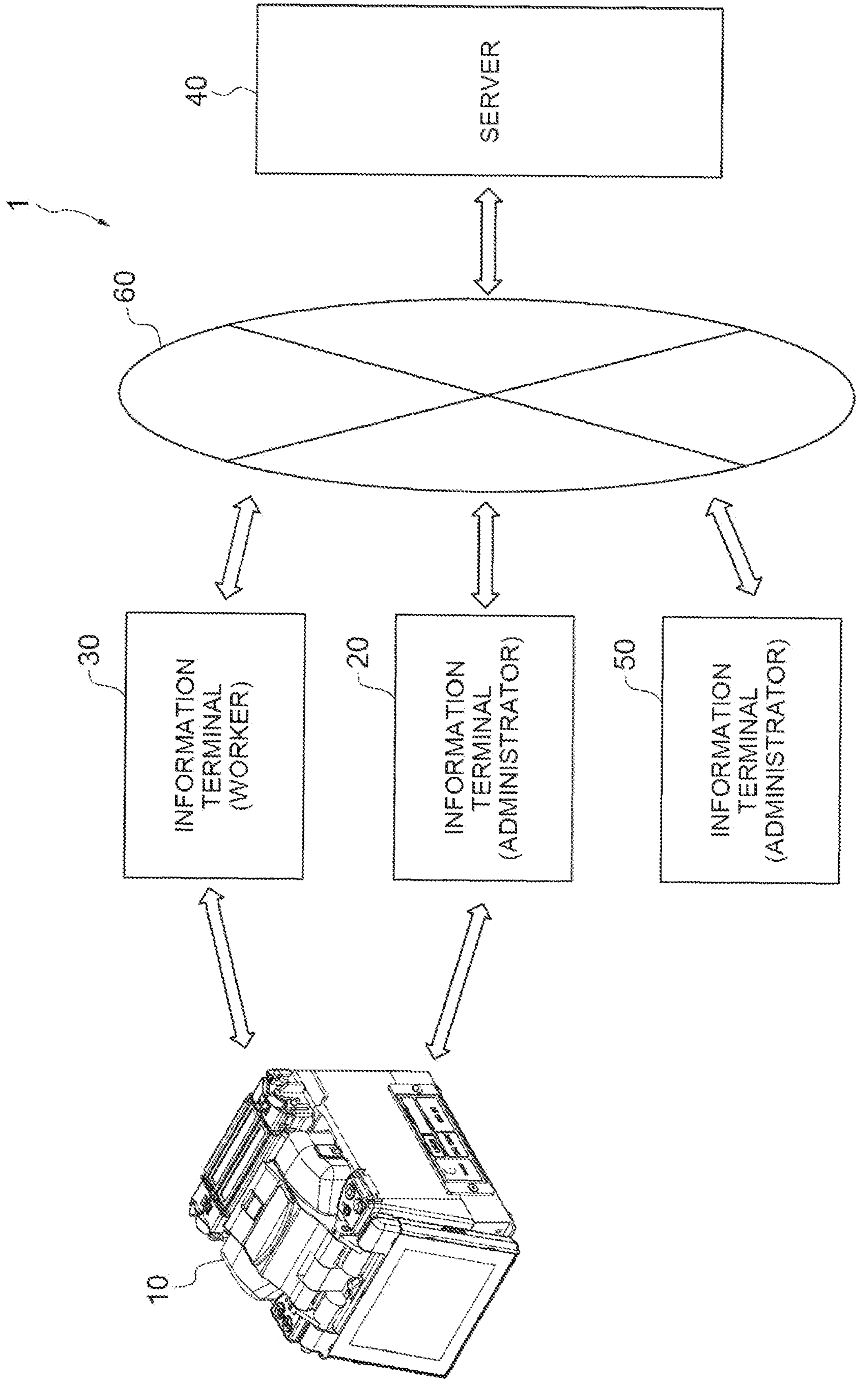
FIG. 1 is a diagram schematically illustrating a configuration of a fusion splicing system according to an embodiment of the present disclosure.

Problems to be Solved by the Present Disclosure

Fusion splicers are used, for example, at sites where optical fibers are installed. At an installation site, a user (worker) of the fusion splicer performs work other than optical fiber fusion work, and thus the user may leave the fusion splicer. In this case, the fusion splicer may be stolen. An apparatus of Patent Literature 1 discloses a system for curbing theft of a fusion splicer, but further improvement is desired.

Therefore, an object of the present disclosure is to provide a fusion splicing system, an operation control method for a fusion splicer, and a server capable of curbing theft of a fusion splicer.

Advantageous Effects of Invention

According to the present disclosure, it is possible to curb theft of the fusion splicer.

Description of Embodiments of the Present Disclosure

First, embodiments of the present disclosure will be listed and described. A fusion splicing system according to an embodiment includes a fusion splicer including a fusion mechanism configured to fusion-splice optical fibers, and a control unit including a communication unit to communicate with an external device, the control unit being configured to control an operation of the fusion mechanism; a first information terminal capable of communicating with the fusion splicer; and a server capable of communicating with the first information terminal. The control unit of the fusion splicer is configured to be able to set locking on an operation of the fusion mechanism before use. The first information terminal acquires locking release information to temporarily release the locking setting from the server, and transmits a locking release command signal including the locking release information to the fusion splicer. The control unit of the fusion splicer determines whether or not the locking release information included in the received locking release command signal is appropriate, and temporarily releases the locking setting on the fusion mechanism so as to enable the fusion mechanism when the locking release information is appropriate.

In the fusion splicing system, the locking on the operation of the fusion mechanism of the fusion splicer is set before use, and the locking setting is released by the locking release command signal from the first information terminal so that the fusion splicer is available. That is, in this fusion splicing system, the fusion splicer is in an operation-locked state from the beginning, and the operation locking is released temporarily (during a predetermined period) by the first information terminal at the time of use, and then is used, unlike the related art focusing on countermeasures against a case in which there is theft. Moreover, the first information terminal receives the locking release information used for the locking release signal from the server. Therefore, even when the fusion splicer is stolen, the fusion splicer is not available with the fusion splicer being locked unless there is no the server or first information terminal and, as a result, theft of the fusion splicer is curbed. Further, since the locking release information is acquired from the server, it is not necessary for the worker of the fusion splicer to hold and manage the locking release information.

In the fusion splicing system, the first information terminal may transmit a request for acquisition of the locking release information to the server together with at least one of identification information of the first information terminal and user information of the first information terminal, and the server may transmit, to the first information terminal, the locking release information corresponding to the identification information or user information included in the acquisition request received from the first information terminal. In this case, since the server can manage the locking release information for releasing the operation locking of the fusion splicer, it is possible to further curb theft of the fusion splicer.

In the fusion splicing system, when the first information terminal acquires the locking release information from the server, the first information terminal may not display release password information to release the locking included in the locking release information, and may display identification information of the fusion splicer associated with the locking release information. In this case, even when the first information terminal is, for example, stolen and used, a thief cannot easily know the release password information for releasing the locking of the locked fusion splicer, the locking cannot be released once the fusion splicer is locked and connection to the server is disabled, and it is possible to further curb theft of the fusion splicer.

The fusion splicing system may further include a second information terminal configured to transmit a locking setting command signal including lock information to set locking on an operation of the fusion splicer, to the fusion splicer, and the second information terminal may acquire the lock information from the server. In this case, since the administrator of the fusion splicer can set locking on an operation of the fusion splicer using the second information terminal different from the first information terminal used by the worker, it becomes easier to manage the prevention of theft of the fusion splicer.

In the fusion splicing system, when the second information terminal may transmit the locking setting command signal to the fusion splicer, the second information terminal also transmits time information of the second information terminal. In this case, it is possible to synchronize the time of the fusion splicer with the time of the second information terminal used by the administrator, and make it easier for the administrator to manage the fusion splicer more reliably.

In the fusion splicing system, the lock information may include release password information to release the locking setting of the operation of the fusion splicer. In this case, the lock information may further include at least one of locking start date information to start to set locking on the operation of the fusion splicer and lock cycle information for continuity of the locking setting on the operation of the fusion splicer. This makes it possible to control the set locking on the operation of the fusion splicer more finely.

In the fusion splicing system, when the second information terminal receives, from the fusion splicer, a completion notification indicating that locking setting on the operation of the fusion mechanism has been completed after transmitting a locking setting command signal to the fusion splicer, the second information terminal may transmit locking setting execution information in the fusion splicer, to the server, and the server may store the locking setting execution information in a storage unit. In this case, the locking setting execution information may include at least one of an identification number of the second information terminal that has set locking on the fusion splicer, user information of the second information terminal, locking setting execution date and time information, locking setting execution position information, and locking setting execution result information. This makes it possible for the server to centrally manage release information for the set locking on the operation of the fusion splicer, and makes the management of the fusion splicer by the administrator more reliable.

In the fusion splicing system, the second information terminal may acquire locking setting release information that clears the locking setting on the fusion splicer according to the locking setting command signal from the server, and transmit a locking setting release command signal including the locking setting release information to the fusion splicer. In this case, when the fusion splicer is, for example, maintained, it is possible to collectively release the locking setting on the operation of the fusion splicer.

In the fusion splicing system, when the second information terminal receives, from the fusion splicer, a completion notification indicating that the locking setting on the operation of the fusion mechanism has been cleared, after transmitting the locking setting release command signal to the fusion splicer, the second information terminal transmits locking setting release execution information indicating that the locking setting on the fusion splicer has been cleared, to the server. This makes it possible for the server to centrally manage release information for clearing the locking setting on the operation of the fusion splicer, and makes the management of the fusion splicer by the administrator more reliable.

In the fusion splicing system, the locking release information transmitted from the server to the first information terminal may include use period information in which the operation of the fusion mechanism is temporarily performed. This makes it easier to adjust the use period in which the locking setting on the operation of the fusion splicer is released.

In the fusion splicing system, when the first information terminal has received, from the fusion splicer, a completion notification indicating that temporary release of the locking setting on the operation of the fusion mechanism has been completed after transmitting the locking release command signal to the fusion splicer, the first information terminal transmits the locking release execution information in the fusion splicer to the server. In this case, the locking release execution information includes at least one of the identification number of the first information terminal that has temporary released the locking on the fusion splicer, user information of the first information terminal, locking release execution date and time information, locking release execution position information, and locking release result information. This makes it possible for the server to centrally manage release information for the locking setting on the operation of the fusion splicer, and makes the management of the fusion splicer by the administrator more reliable.

In the fusion splicing system, the server may include a storage unit, at least two of release password information included in lock information to set locking on the operation of the fusion splicer, user information of the first information terminal, user information of the second information terminal, time information of the fusion splicer, use period information in which the locking setting of the fusion splicer is temporarily released, and lock cycle information to put the fusion splicer of which locking setting has been temporarily released into a locked state again being stored in association with each other in the storage unit. This makes it possible for the server to centrally manage the locking setting on the operation of the fusion splicer and the release of the locking setting on the operation of the fusion splicer, and makes management of the fusion splicer by the administrator more reliable.

Am operation control method for a fusion splicer according to an embodiment is an operation control method for controlling an operation of a fusion splicer including a fusion mechanism configured to fusion-splice optical fibers, and a control unit including a communication unit to communicate with an external device, the control unit being configured to control an operation of the fusion mechanism, by a first information terminal capable of communicating with the fusion splicer. This operation control method includes acquiring, with the first information terminal, locking release information to release the locking setting on the fusion splicer, the locking on an operation of the fusion mechanism being set in the fusion splicer, from a server; transmitting, with the first information terminal, a locking release command signal including the locking release information acquired from the server to the fusion splicer; and determining, with the control unit, whether or not the locking release information included in the received locking release command signal is appropriate. The locking setting by the control unit is released and the fusion mechanism is temporarily enabled when the locking release information is determined to be appropriate in the determining.

In the operation control method for a fusion splicer, the locking on the operation of the fusion mechanism of the fusion splicer is set before use, and the locking setting is released by the locking release command signal from the first information terminal so that the fusion splicer is available, as in the fusion splicing system described above. Therefore, according to this operation control method, even when the fusion splicer is stolen, the fusion splicer is not available and, as a result, theft of the fusion splicer is curbed. In this operation control method, an operation performed in any of the configurations of the fusion splicing system described above may be appropriately performed.

The operation control method further includes: transmitting a locking setting command signal including lock information to set locking on the operation of the fusion mechanism of the fusion splicer from the second information terminal to the fusion splicer; and setting, with the control unit of the fusion splicer, the locking on the operation of the fusion mechanism on the basis of the lock information included in the received locking setting command signal. In this case, it is possible to set locking on the fusion splicer more reliably using the second information terminal used by the administrator.

A server according to an embodiment includes a storage unit configured to store identification information of a plurality of fusion splicers, locking release information to release locking setting an operation of each of the plurality of fusion splicers, and information on a worker who is able to request release of the locking setting on each of the plurality of fusion splicers in association with one another; a communication unit configured to receive, from an external information terminal, a request for acquisition of locking release information of at least one of the plurality of fusion splicers; and a determination unit configured to determine whether or not the worker information included in the received acquisition request matches worker information associated with the fusion splicer for which the locking release information stored in the storage unit is requested. When the determination unit determines that the worker information included in the received acquisition request matches the stored worker information, the communication unit transmits locking release information associated with the fusion splicer to the external information terminal. With this server, it is possible to curb theft of the fusion splicer, as in the fusion splicing system and the operation control method for a fusion splicer described above.

In the above server, the storage unit may store lock cycle information at which locking on the operation of each of the plurality of fusion splicers is set, and period information of a use period in which the locking setting is temporarily released so that the fusion splicer is available, in association with the identification information. In this case, it is possible to control the locking setting on the operation of the fusion splicer more finely.

The fusion splicing system, the operation control method for the fusion splicer, and the server may be configured by appropriately combining the units thereof. Further, a configuration of a part (for example, a fusion splicer, a first information terminal, and a second information terminal) of the fusion splicing system, a method by the configuration, or the like may be defined as an example of the embodiment.

Details of Embodiment of the Present Disclosure

Specific examples of a fusion splicing system, a fusion splicer, an information terminal, a server, and an operation control method for a fusion splicer according to an embodiment of the present disclosure will be described hereinafter with reference to the drawings. The present invention is not limited to these examples, but is intended to include all changes within the meaning and scope equivalent to the claims, which are indicated by the claims. In the following description, the same elements are denoted by the same reference signs in the description of the drawings, and repeated description will be omitted.

FIG. 1 is a diagram schematically illustrating a configuration of a fusion splicing system 1 according to an embodiment of the present disclosure. The fusion splicing system 1 includes a fusion splicer 10, an information terminal 20 (second information terminal), an information terminal 30 (a first information terminal), and a server 40. The fusion splicer 10 is a device that performs fusion splicing on optical fibers. The information terminal 20 is handled by an administrator who uses and manages the fusion splicer 10. The information terminal 20 is, for example, a portable wireless communication terminal such as a smartphone, or a fixed communication terminal such as a communicative personal computer. The information terminal 30 is owned by a worker who uses the fusion splicer 10. The information terminal 30 is, for example, a mobile wireless communication terminal such as a smart phone. The fusion splicer 10 is configured to communicate with the information terminals 20 and 30 through wireless connection, for example. One fusion splicer 10, one corresponding information terminal 20, and one corresponding information terminal 30 are illustrated in FIG. 1, but the fusion splicing system 1 is not limited thereto, and may include a plurality of fusion splicers 10 and a plurality of information terminals 20 and 30 corresponding thereto. Hereinafter, a set of the fusion splicer 10 and the information terminals 20 and 30 will be mainly described, but another fusion splicer 10 or the like also has the same configuration.

The server 40 is a management server that controls a relationship between the plurality of fusion splicers 10, and an administrator who manages the plurality of fusion splicers 10 and each user who uses each of the plurality of fusion splicers 10, and is configured of a computer that can communicate with the information terminals 20 and 30 via a communication network 60. The communication network 60 is, for example, the Internet. The server 40 is located in a certain area on the Earth, and the fusion splicer 10 and the information terminals 20 and 30 may be located in a different area (country or the like) different from the area in which the server 40 is located, or may be located in the same area (a country or the like). The administrator may use an information terminal 50 such as a PC to confirm various types of management data stored in the server 40 and to register/update necessary information.

Figure 2:
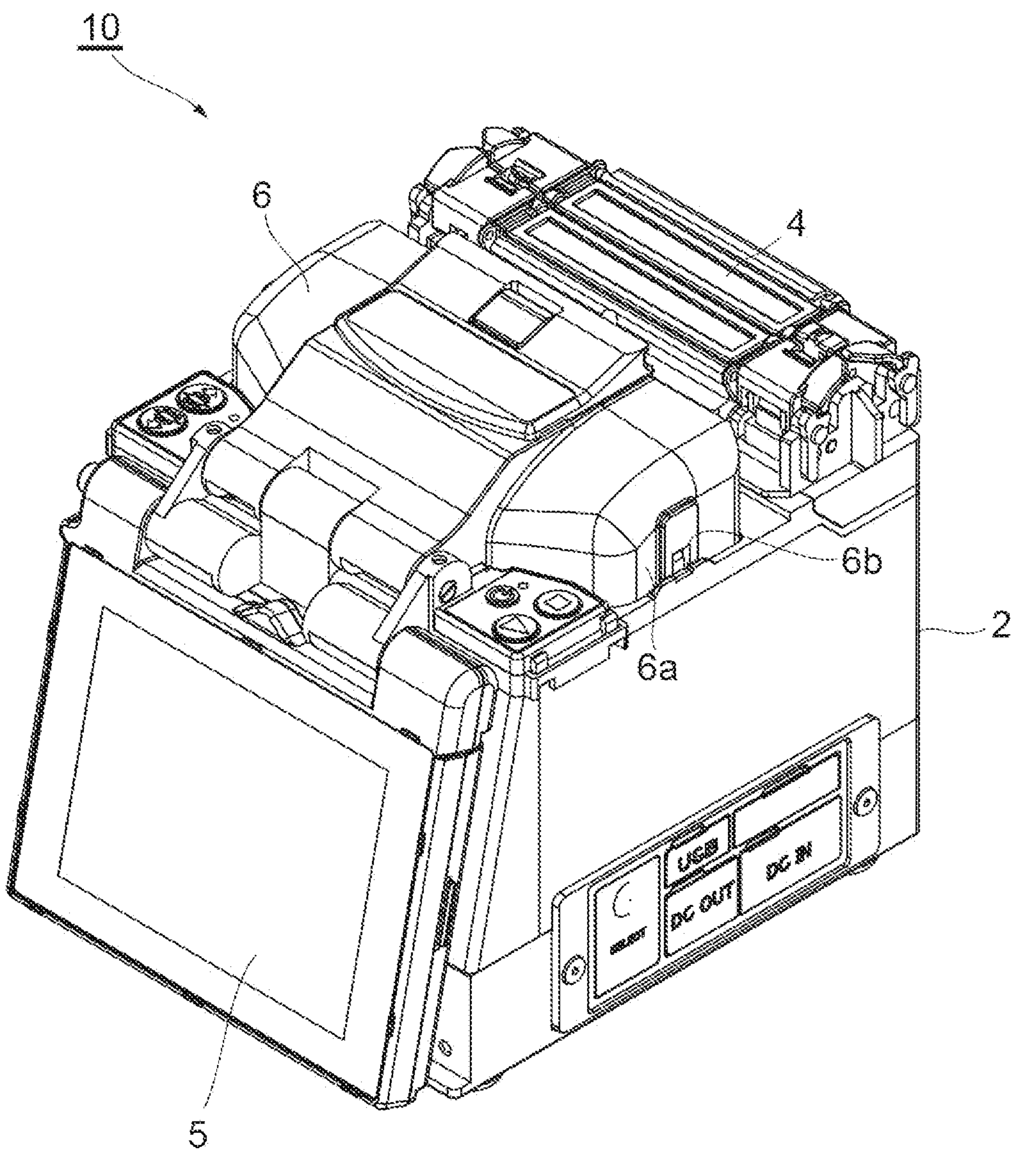
FIG. 2 illustrates an appearance of a fusion splicer in a state in which a windshield cover is closed.
Figure 3:
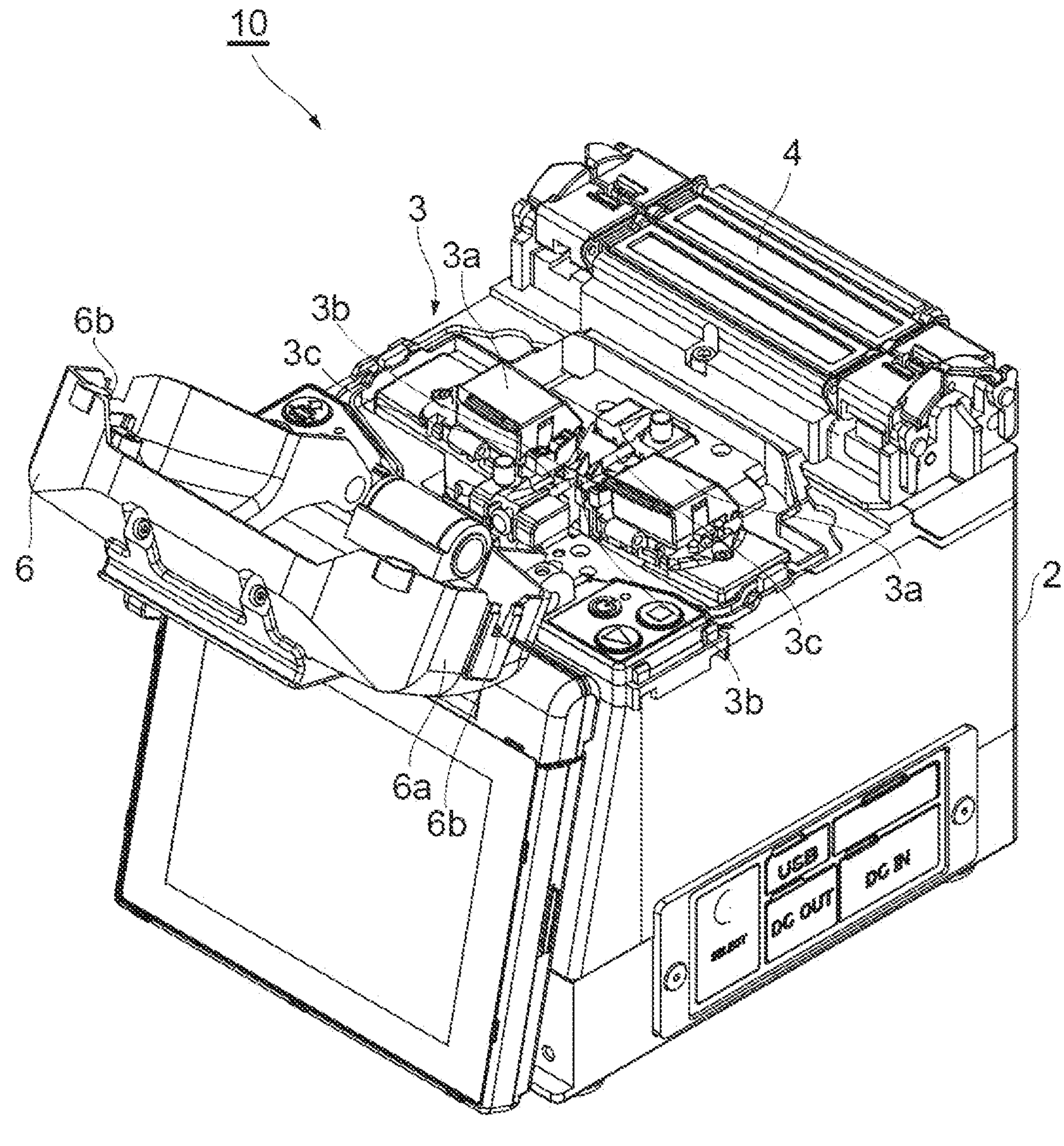
FIG. 3 illustrates an external appearance of the fusion splicer in a state in which the windshield cover is open so that an internal structure can be seen.

FIGS. 2 and 3 are perspective views illustrating an appearance of the fusion splicer 10. FIG. 2 illustrates the appearance in a state in which the windshield cover is closed, and FIG. 3 illustrates the appearance in a state in which the windshield cover is open so that an internal structure of the fusion splicer 10 can be seen. The fusion splicer 10 is a device for performing fusion splicing on optical fibers, and includes a box-shaped housing 2 as illustrated in FIGS. 2 and 3. In an upper portion of this housing 2, a fusion unit 3 (a fusion mechanism) for fusing the optical fibers, and a heater 4 (fusion mechanism) that heats a fiber reinforcing sleeve that covers a fusion splicing portion of the optical fibers fused by the fusion unit 3 so that the fiber reinforcing sleeve shrinks, are provided. The fusion splicer 10 includes a monitor 5 that displays a situation of fusion splicing between the optical fibers imaged by a camera (not illustrated) disposed inside the housing 2. Further, the fusion splicer 10 includes a windshield cover 6 for preventing wind from entering the fusion unit 3.

The fusion unit 3 is a fusion mechanism having a holder placement portion on which a pair of optical fiber holders 3*a* can be placed, a pair of fiber positioning portions 3*b*, and a pair of discharge electrodes 3*c*. Each optical fiber that is a fusion target is held in and fixed to the optical fiber holder 3*a*, and each optical fiber holder is placed and fixed on a holder placement portion. The fiber positioning portion 3*b* is disposed between the optical fiber holders 3*a* and positions a tip portion of the optical fiber held by each the optical fiber holders 3*a*. The discharge electrode 3*c* is an electrode disposed between the fiber positioning portions 3*b* and fusing the tips of the optical fibers through arc discharge.

The windshield cover 6 is connected to the housing 2 to cover the fusion unit 3 in an openable and closable manner. In each of side surfaces 6*a* of the windshield cover 6, an introduction portion 6*b* for introducing an optical fiber to the fusion unit 3 (that is, to each of the optical fiber holders 3*a*) is formed.

Figure 4:
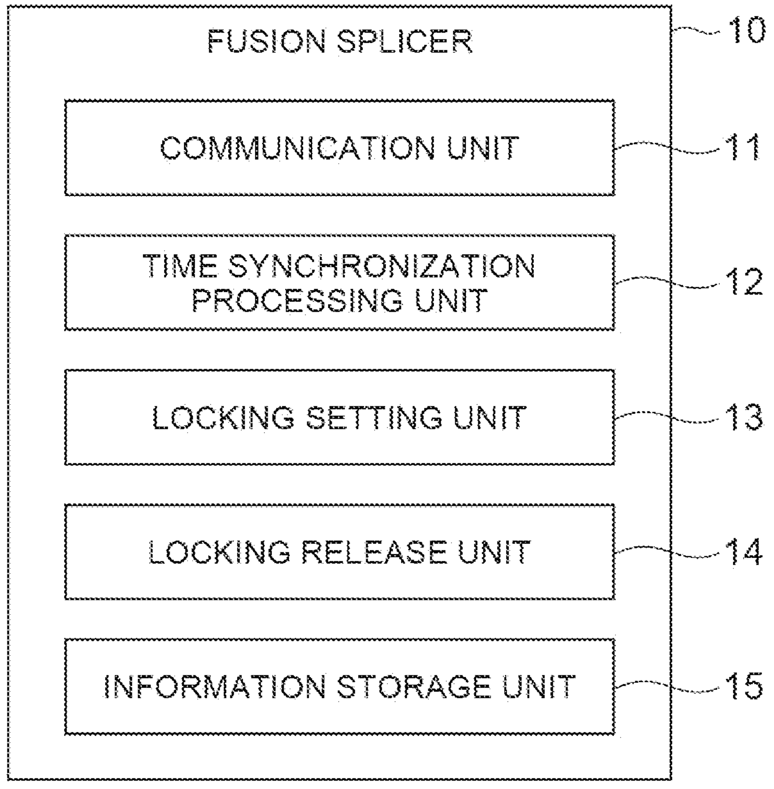
FIG. 4 is a block diagram illustrating a functional configuration of the fusion splicer (control unit).
Figure 5:
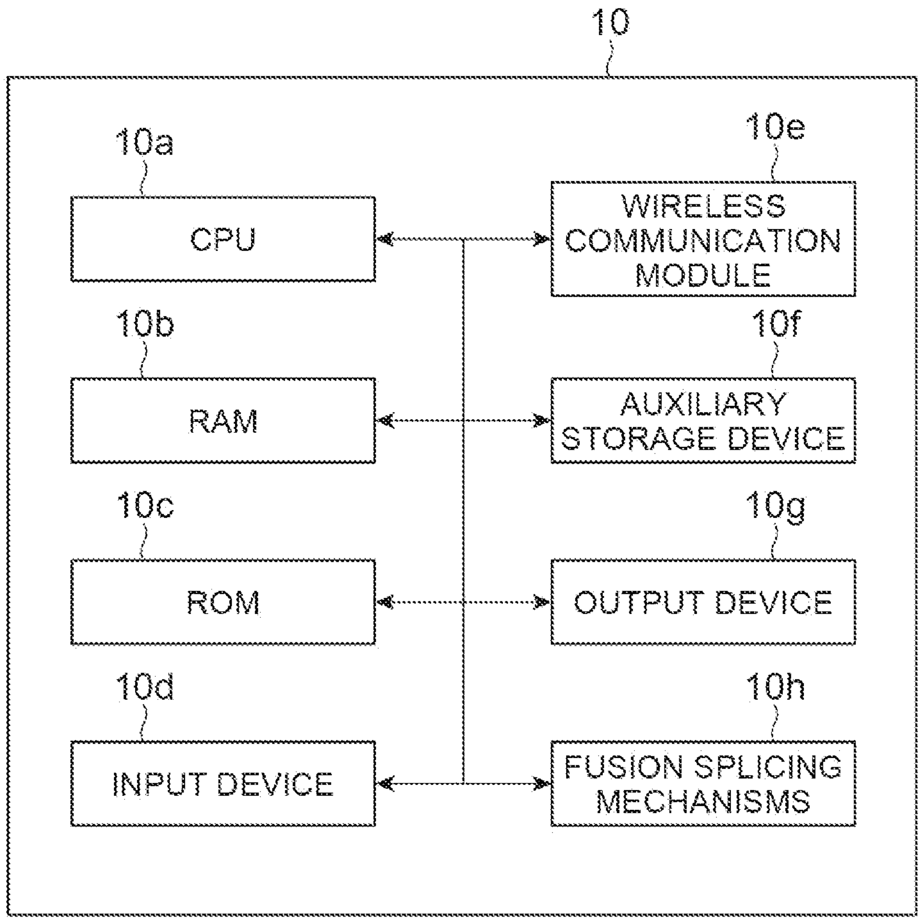
FIG. 5 is a block diagram illustrating a hardware configuration of the fusion splicer.

FIG. 4 is a block diagram illustrating a functional configuration of the fusion splicer 10. FIG. 5 is a block diagram illustrating a hardware configuration of the fusion splicer 10. As illustrated in FIG. 4, a control unit of the fusion splicer

10 functionally includes a communication unit 11, a time synchronization processing unit 12, a locking setting unit 13, a locking release unit 14, and an information storage unit 15. The fusion splicer 10 includes a computer including hardware such as a CPU 10*a*, a RAM 10*b*, a ROM 10*c*, an input device 10*d*, a wireless communication module 10*e*, an auxiliary storage device 10*f*, and an output device 10*g* as control unit thereof, as illustrated in FIG. 5. Each function of the fusion splicer 10 is realized by these components operating according to a program or the like. Further, the fusion splicer 10 includes various fusion splicing mechanisms 10*h* other than the control unit.

The communication unit 11 is a unit that communicates with the information terminal 20 and the information terminal 30. The communication unit 11 performs, for example, wireless communication conforming to IEEE 802.11 (registered trademark: Wi-Fi) or IEEE 802.15.1 (registered trademark: Bluetooth) with the information terminal 20 and the information terminal 30. The communication unit 11 controls a wireless module that performs such wireless communication.

The time synchronization processing unit 12 is a unit that synchronizes an internal time of the fusion splicer 10 with time information wirelessly transmitted from the administrator information terminal 20. When the time synchronization processing unit 12 receives the time information of the information terminal 20 from the information terminal 20 via the communication unit 11, the time synchronization processing unit 12 performs a process of applying the received time information to an internal clocking of the fusion splicer 10. The synchronized time information can also be displayed on the monitor 5 of the fusion splicer 10, for example. When the time synchronization process ends, the time synchronization processing unit 12 may transmit a completion report indicating that the time synchronization process has been performed, to the information terminal 20 via the communication unit 11.

The locking setting unit 13 is a unit that sets locking on an operation process of the fusion splicer 10 on the basis of the passcode setting command (locking setting command signal) wirelessly transmitted from the administrator information terminal 20. The passcode setting command includes, for example, a locking start date when the operation process of the fusion splicer 10 is locked, a release password for locking release, and a lock cycle (for example, every startup, daily, weekly, or monthly) at which the operation process of the fusion splicer 10 is locked. When the locking setting unit 13 receives the passcode setting command from the information terminal 20, the locking setting unit 13 sets the operation locking of the fusion splicer 10 on the basis of information such as the locking start date and the lock cycle. Due to the locking setting by the locking setting unit 13, the operation of the fusion splicer 10 is locked according to a predetermined cycle after the locking start date. The locking setting by the locking setting unit 13 can be released by the locking release unit 14 determining that the release password included in the locking release command (locking setting release command signal) transmitted from, for example, the information terminal 30 mainly used by the user, matches the release password included in the passcode setting command. The locking setting unit 13 may perform a process of powering OFF or restarting the fusion splicer 10 once after the operation locking setting of the fusion splicer 10 has been completed or to complete the operation locking setting. When the operation locking setting of the fusion splicer 10 is completed, the locking setting unit 13 may transmit a completion report indicating that the operation locking setting has been performed to the information terminal 20 via the communication unit 11.

Further, the locking setting unit 13 is a unit that clears (releases) the setting of the operation locking process of the fusion splicer 10 described above. When the locking setting unit 13 receives a locking setting release command (locking setting release command signal) from the administrator information terminal 20, the locking setting unit 13 performs a process of clearing (releasing) the setting itself of the operation locking process of the fusion splicer 10 that has been already set. Through this process, the fusion splicer 10 returns to an initial state in which the locking process is not performed. The locking setting unit 13 may cause a process of turning off or restarting the fusion splicer 10 once after setting clearing of the operation locking process of the fusion splicer 10 has been completed or in order cause the setting clearing to be completed. When the setting clearing of the operation locking process of the fusion splicer 10 is completed, the locking setting unit 13 may transmit a completion report indicating that the setting of the operation locking process has been cleared to the information terminal 20 via the communication unit 11.

The locking release unit 14 is a unit that releases the setting of the operation locking of the fusion splicer 10 of which the operation has been locked, during a predetermined period (that is, temporarily), on the basis of a locking release command (locking setting release command signal) wirelessly transmitted from the worker information terminal 30. The locking release command includes information such as a release password for temporarily releasing the setting of the operation locking of the fusion splicer 10, and a period (use period) in which the operation locking of the fusion splicer 10 can be released. When the locking release unit 14 receives the locking release command from the worker information terminal 30, the locking release unit 14 determines whether or not the release password included in the locking release command matches the release password included in the locking setting command. When the passwords match, the locking release unit 14 releases the operation locking of the fusion splicer 10 set by the locking setting unit 13 during a predetermined period. When the passwords do not match, the locking release unit 14 displays information indicating that the passwords do not match, for example, on the monitor 5 to notify the worker that the passwords do not match. When the locking release unit 14 has completes the process of releasing the operation locking of the fusion splicer 10, the locking release unit 14 may transmit a completion report indicating that the locking release process has been performed to the information terminal 30 via the communication unit 11. A configuration in which the locking setting released by the locking release unit 14 returns to the locking setting again when a predetermined use period elapses is adopted.

The information storage unit 15 is a unit that stores various types of information such as fusion data between optical fibers performed by the fusion splicer 10, a release password for locking setting/release described above, a time of the fusion splicer 10, and a serial number (identification information). The information storage unit 15 outputs or receives necessary information in response to requests from the time synchronization processing unit 12, the locking setting unit 13, and the locking release unit 14, and stores the information.

Figure 6A:
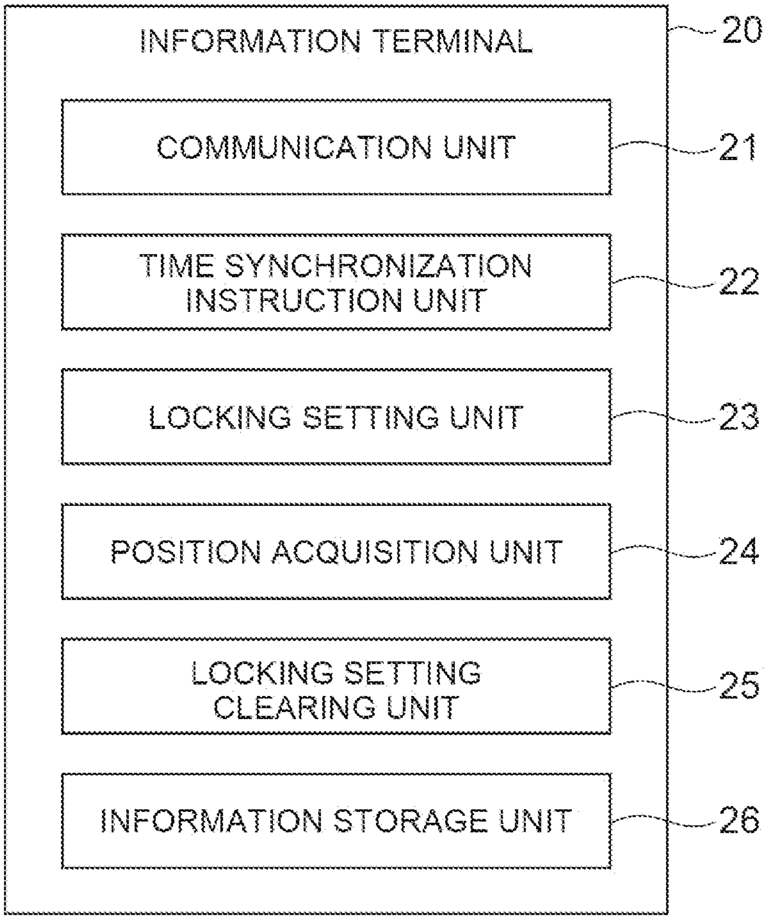
FIG. 6A is a block diagram illustrating a functional configuration of an administrator information terminal.
Figure 6B:
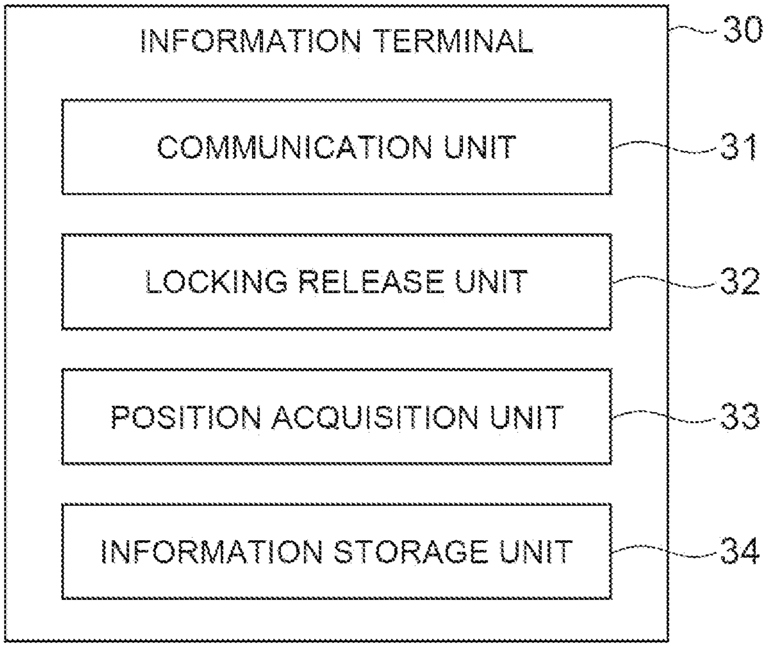
FIG. 6B is a block diagram illustrating a functional configuration of a worker information terminal.
Figure 7:
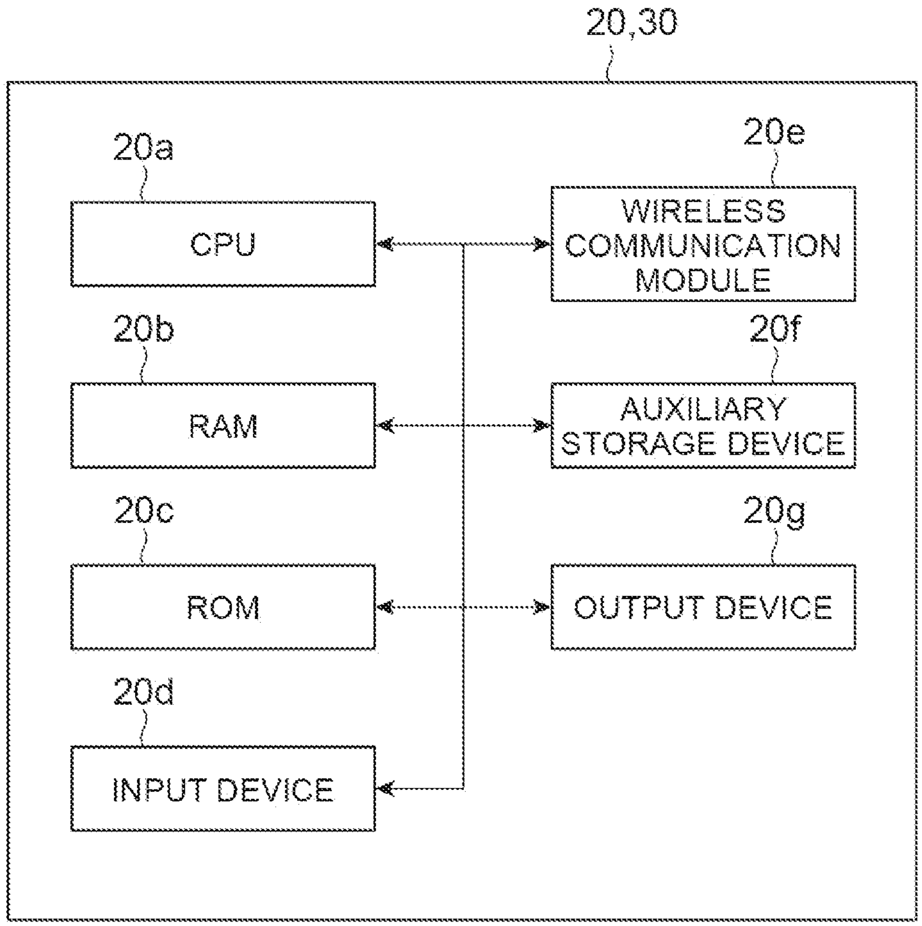
FIG. 7 is a block diagram illustrating a hardware configuration common to the respective information terminals.

FIGS. 6A and 6B are block diagrams illustrating functional configurations of the information terminal 20 and the information terminal 30. FIG. 7 is a block diagram illustrating a hardware configuration common to the information terminals 20 and 30. The information terminal 50 also has the same hardware configuration as that in FIG. 7. As illustrated in FIG. 6A, the administrator information terminal 20 includes a communication unit 21, a time synchronization instruction unit 22, a locking setting unit 23, a position acquisition unit 24, a locking setting clearing unit 25, and an information storage unit 26. As illustrated in FIG. 6B, the worker information terminal 30 includes a communication unit 31, a locking release unit 32, a position acquisition unit 33, and an information storage unit 34. As illustrated in FIG. 7, the information terminals 20 and 30 each include a computer including hardware such as a CPU 20*a*, a RAM 20*b*, a ROM 20*c*, an input device 20*d*, a communication module 20*e*, an auxiliary storage device 20*f*, and an output device 20*g*. The information terminals 20 and 30 realize each function illustrated in FIGS. 6A and 6B by these components operating according to a program or the like.

In the information terminal 20, the communication unit 21 is configured of the communication module 20*e* such as a wireless LAN module built into the terminal, for example. The communication unit 21 transmits or receives various signals or information through wireless communication to or from the fusion splicer 10 via a wireless LAN. The communication unit 21 performs communication conforming to, for example, IEEE802.11 or IEEE802.15.1 corresponding to the wireless standard of the fusion splicer 10. Other bands or communication standards may be used as long as wireless communication can be performed with the fusion splicer 10. In addition, the communication unit 21 transmits or receives various signals and information to and from the server 40 via the communication network 60 such as the Internet. Therefore, the communication unit 21 may also serve as the wireless LAN module described above, or may include another communication module (a mobile communication module such as 4G or 5G, or the like).

The time synchronization instruction unit 22 is a unit for synchronizing the time of the fusion splicer 10 at which the locking of the operation process is set by the administrator information terminal 20, with a reference time of the information terminal 20 or the like. Before the locking setting unit 23 instructs the locking process of the fusion splicer 10, the time synchronization instruction unit 22, for example, transmits a time of the information terminal 20 serving as a reference time to the fusion splicer 10. The time synchronization instruction unit 22 may use a time set by the server 40 as the reference time.

Figure 14:
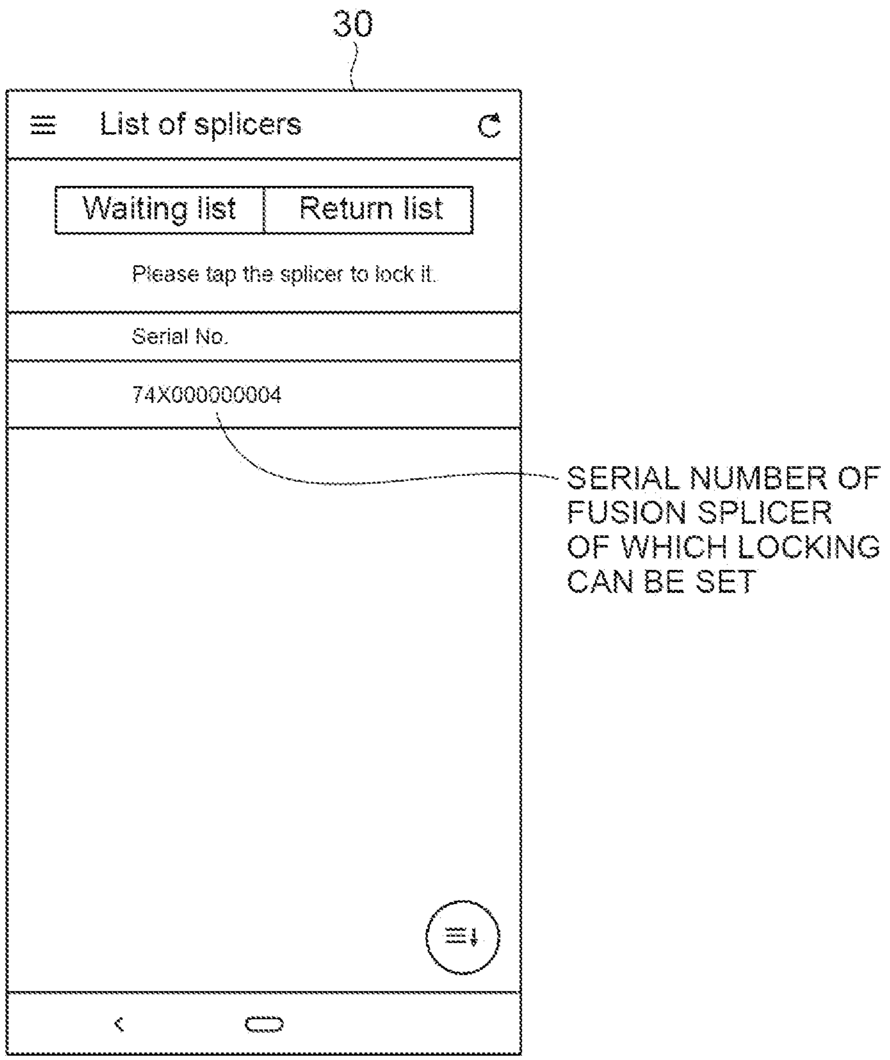
FIG. 14 is a diagram illustrating an example of an operation screen in the administrator information terminal when the process of locking operation illustrated in FIG. 10 is performed.

The locking setting unit 23 is a unit that sets the locking on the operation of the fusion splicer 10 that is managed by the administrator information terminal 20. When the locking setting unit 23 receives an input indicating that the locking setting is to be performed by an operation of the administrator, the locking setting unit 23 acquires, from the server 40, list information of the fusion splicers 10 that are locking setting targets managed by the administrator, which is registered in the server 40. This list information includes information such as a serial number of each fusion splicer 10, a release password when the operation process of the fusion splicer 10 is locked, and a cycle at which the operation of the fusion splicer 10 is locked. The cycle at which the operation is locked is a cycle for locking again when the locking of the fusion splicer 10 subjected to the operation locking process is temporarily locking released by the release password, and every restart of the fusion splicer 10, daily, weekly, monthly, or the like is set. When the locking setting unit 23 receives the list information from the server 40, the locking setting unit 23 displays a list of the serial numbers of the fusion splicers 10 on a display of the information terminal 20 to set a state in which the fusion splicer 10 of which the lock is to be set can be selected (see, for example, FIG. 14). The locking setting unit 23 transmits the passcode setting command to the fusion splicer 10 selected from the selectable list. The passcode setting command includes information such as the locking start date, the release password, and the lock cycle, as described above. The locking setting unit 23 may transmit a power OFF command to the fusion splicer 10 together with the passcode setting command.

Further, when the locking setting unit 23 acquires information indicating that the locking setting has been completed from the fusion splicer 10 that has instructed the locking setting, the locking setting unit 23 generates locking setting execution information. The locking setting execution information includes a person (administrator) who has performed the locking setting, an execution date and time, position information, a locking setting result, and various types of information of the information terminal 20 (a brand name, model name, OS version information, application version information, terminal-specific ID (UUID), and the like), and these pieces of information are associated with the serial number of the fusion splicer 10 of which the lock has been set. The locking setting unit 23 uploads locking execution information including the serial number of the fusion splicer 10 to the server 40. The server 40 updates the management data on the basis of the received locking execution information.

The position acquisition unit 24 is a unit that acquires position information of the information terminal 20 from data of a GPS, base station, or the like. The position acquisition unit 24 acquires the position information of the information terminal 20 on the basis of a request from the locking setting unit 23 or the like, and provides the position information to the locking setting unit 23 or the like. The position acquisition unit 24 may acquire position information according to a predetermined cycle and store the position information in the information storage unit 26.

The locking setting clearing unit 25 is a unit that clears (releases) the operation locking setting of the fusion splicer 10 managed by the administrator information terminal 20. When the locking setting clearing unit 25 receives an input indicating that the locking setting is to be cleared by an operation of the administrator, the locking setting clearing unit 25 acquires, from the server 40, list information of the fusion splicers 10 that are locking setting targets managed by the administrator, which is registered in the server 40. This list information includes the serial number of each fusion splicer 10 or the like, and may include a release password when the locking of the operation process of the fusion splicer 10 has been set. When the locking setting clearing unit 25 receives the list information from the server 40, the locking setting clearing unit 25 displays the list of the serial numbers of the fusion splicers 10 on the display of the information terminal 20, to set a state in which the fusion splicer 10 that performs a locking setting clearing process can be selected. The locking setting clearing unit 25 transmits the locking setting release command to the fusion splicer 10 selected from the selectable list. Information for releasing the setting of the locking of the fusion splicer 10 is included in the locking setting release command. The locking setting clearing unit 25 may transmit the power OFF command to the fusion splicer 10 together with the locking setting release command.

Further, when the locking setting clearing unit 25 acquires information indicating that the release of the locking setting has been completed from the fusion splicer 10 that has instructed the locking setting clearing process, the locking setting clearing unit 25 generates locking setting release execution information. The locking setting release execution information includes a person (administrator) who has released the locking setting, an execution date and time, position information, a locking setting release result, various types of information of the information terminal 20 (the brand name, the model name, the OS version information, the application version information, the terminal-specific ID (UUID), and the like), and these pieces of information are associated with the serial number of the fusion splicer 10 of which the locking setting has been released. The locking setting clearing unit 25 uploads the locking setting release execution information including the serial number of the fusion splicer 10 to the server 40. The server 40 updates the management data on the basis of the received locking setting release execution information.

The information storage unit 26 is a unit that stores the various types of information described above. The information storage unit 26 may temporarily store locking setting information and the like.

In the information terminal 30, the communication unit 31 is configured of, for example, a communication module 20*e* such as a wireless LAN module built into the terminal, like the communication unit 21. The communication unit 31 transmits and receives various signals and information to and from the fusion splicer 10 through wireless communication via a wireless LAN. The communication unit 31 complies with the wireless standard of the fusion splicer 10. Other bands or communication standards may be used as long as wireless communication can be performed with the fusion splicer 10. In addition, the communication unit 31 transmits or receives various signals and information to and from the server 40 via the communication network 60 such as the Internet. Therefore, the communication unit 31 may also serve as the wireless LAN module described above, or may include another communication module (a mobile communication module such as 4G or 5G, or the like).

Figure 15:
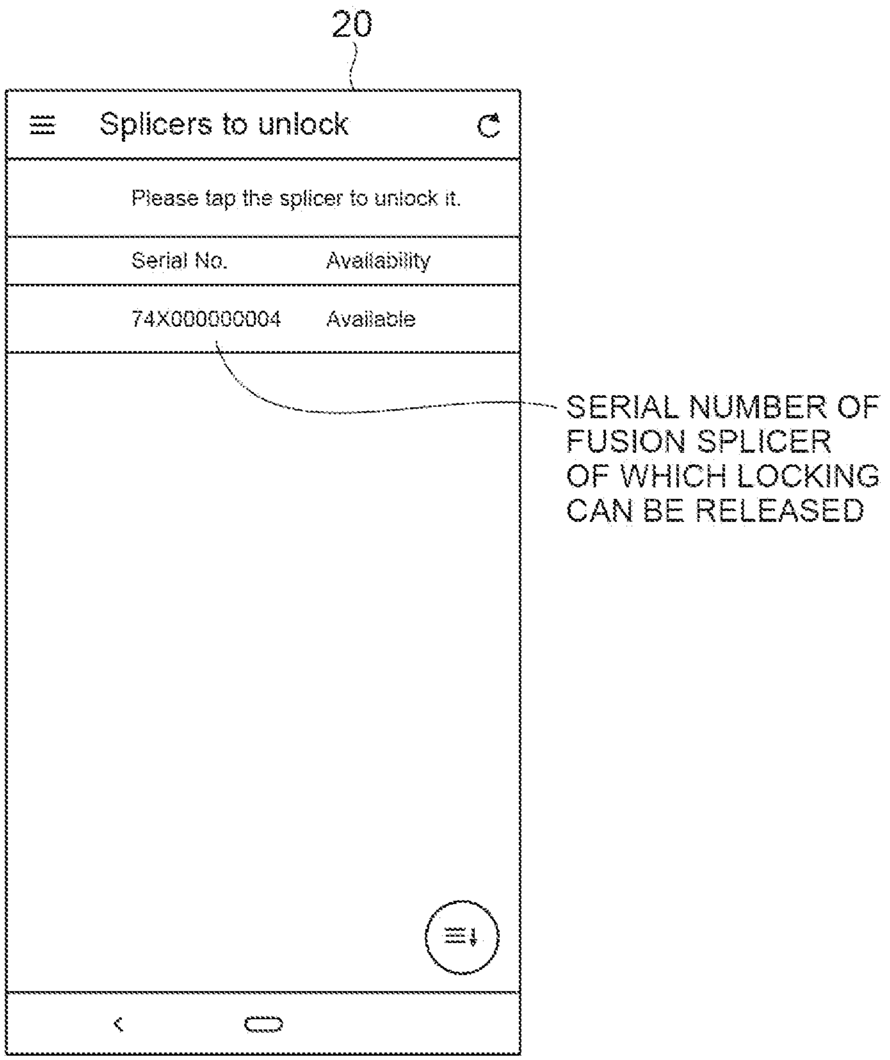
FIG. 15 is a diagram illustrating an example of an operation screen on the worker information terminal when the process of temporarily releasing an operation locking illustrated in FIG. 11 is performed.

The locking release unit 32 is a unit that releases the operation locking of the fusion splicer 10 of which the operation has been locked by the worker information terminal 30. When the locking release unit 32 receives an input indicating that the locking release process is to be performed by the operation of the worker, the locking release unit 32 acquires, from the server 40, the list information of the fusion splicers 10 that can be used by the worker, which is registered in the server 40. The list information of the fusion splicers of which the locking can be released includes information such as the serial number of each fusion splicer 10, the release password when the locking of the operation process of the fusion splicer 10 has been set, and the period (use period) in which the operation locking of the fusion splicer 10 can be released. A period in which the operation locking setting can be released is a period in which the worker can use the fusion splicer 10, and after this period elapses, the locking release of the fusion splicer 10 is invalidated, and the operation of the fusion splicer 10 is locked again. When the locking release unit 32 receives the list information from the server 40, the locking release unit 32 displays the list of the serial numbers of the fusion splicers 10 on the display of the information terminal 30 to set a state in which the fusion splicer 10 to be subjected to the locking release can be selected (see, for example, FIG. 15). The locking release unit 32 transmits the locking release command to the fusion splicer 10 selected from the selectable list. Information such as a release password for releasing the operation locking of the fusion splicer 10 and the period (use period) in which the operation locking of the fusion splicer 10 can be released are included in the locking release command, as described above.

Further, when the locking release unit 32 acquires information indicating that the locking release has been completed from the fusion splicer 10 that has instructed the locking release, the locking release unit 32 generates locking release execution information. The locking release execution information includes a person (worker) who has performed locking release, the execution date and time, the position information, the locking release result, various types of information of the information terminal 30 (the brand name, the model name, the OS version information, the application version information, the terminal-specific ID (UUID), and the like), and these pieces of information are associated with the serial number of the fusion splicer 10 subjected to the locking release. The locking release unit 32 uploads locking release execution information including the serial number of the fusion splicer 10 to the server 40. The server 40 updates the management data on the basis of the received locking release execution information.

The position acquisition unit 33 is a unit that acquires the position information of the information terminal 30 from data such as a GPS or a communication base station. The position acquisition unit 33 acquires the position information of the information terminal 30 on the basis of a request from the locking release unit 32 or the like, and provides the position information to the locking release unit 32 or the like. The position acquisition unit 33 may acquire the position information according to a predetermined cycle and store the position information in the information storage unit 34.

The information storage unit 34 is a unit that stores the various types of information described above. The information storage unit 34 may temporarily store the locking release execution information or the like.

Figure 8:
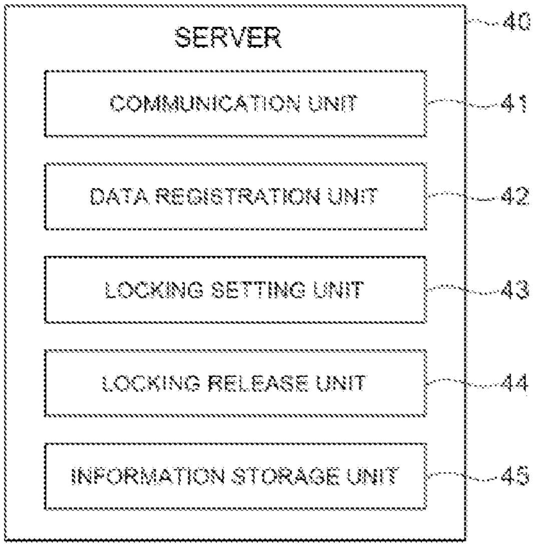
FIG. 8 is a block diagram illustrating a functional configuration of a server.
Figure 9:
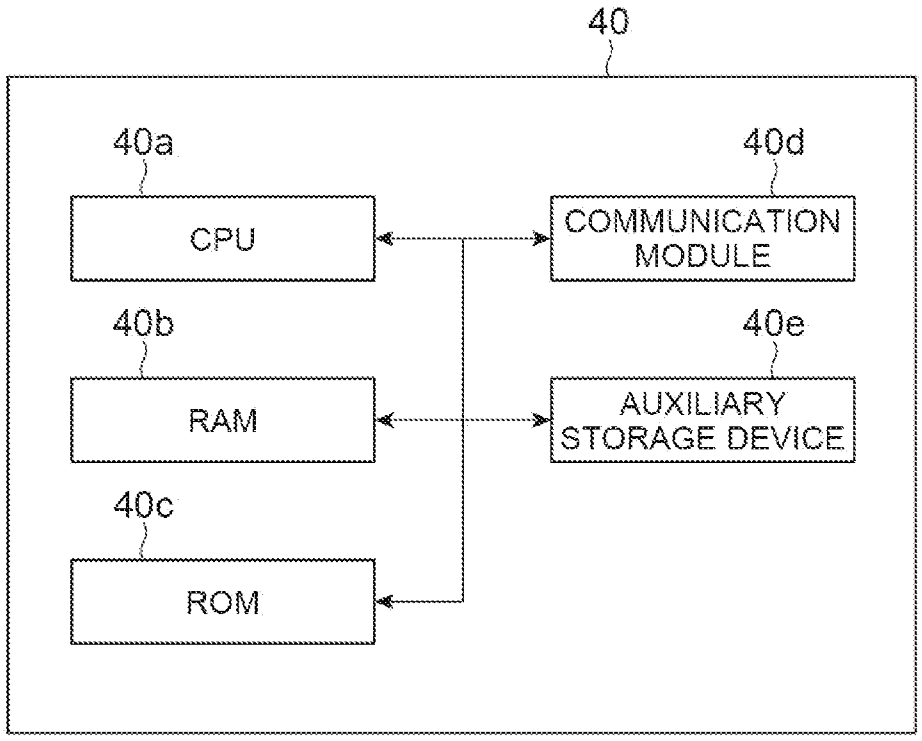
FIG. 9 is a block diagram illustrating a hardware configuration of the server.

FIG. 8 is a block diagram illustrating a functional configuration of the server 40. FIG. 9 is a block diagram illustrating a hardware configuration of the server 40. As illustrated in FIG. 9, the server 40 functionally includes a communication unit 41, a data registration unit 42, a locking setting unit 43, a locking release unit 44, and an information storage unit 45. As illustrated in FIG. 9, the server 40 includes a computer including hardware such as a CPU 40*a*, a RAM 40*b*, a ROM 40*c*, a communication module 40*d*, and an auxiliary storage device 40*e* as a control unit thereof. Each function of the server 40 is realized by these components operating according to a program or the like.

The communication unit 41 is a unit that transmits and receives various signals and information to and from the information terminals 20 and 30 via a communication network 60 such as the Internet.

The data registration unit 42 is a unit that allows the administrator to register management information related to the fusion splicer 10. The management information to be registered includes organization information such as information (a name, telephone number, address, time zone, and the like) on a company that uses or owns the fusion splicer 10 or representative administrator information (a name, e-mail address, administrator account ID/password, and the like), user information such as information (a name, worker account/password, and the like) on a worker who performs work using the fusion splicer 10 or work team information (a team name, users belonging to a team, and the like), and splicer information (a serial number, and the like) of the fusion splicer 10 to be managed.

The locking setting unit 43 is a unit that allows the administrator to register locking setting information of each fusion splicer 10 in a form linked to the serial number of each fusion splicer 10. The locking setting information includes locking setting information such as a release password for releasing the operation locking setting of the fusion splicer 10, the administrator information, the reference time (time zone, or the like), the use period (locking release period) or the lock cycle of the fusion splicer 10, and information on a worker who can release the locked fusion splicer 10 of which the lock has been set. The locking setting unit 43 is configured to display an input interface illustrated in FIG. 17 on a display of the information terminal 50 (a personal computer or the like), for example, to request an input from the administrator. The locking setting unit 43 stores the locking setting information input by the administrator via such an input screen in the information storage unit 45 in association with the serial number of each fusion splicer 10, and manages the locking setting information as the management data (database) (see an example of a DB illustrated in FIG. 19).

The locking setting unit 43 is a unit that transmits the list information to the information terminal 20 via the communication network 60 when there is a request for acquisition of the list information of the fusion splicers that are operation locking setting targets of the fusion splicer 10, from the administrator information terminal 20. The locking setting unit 43 acquires the locking setting execution information from the information terminal 20 when the operation locking setting of the fusion splicer 10 has been completed on the information terminal 20 side. Further, when there is a request for acquisition of the list information of the fusion splicer when the setting of the locking of the fusion splicer 10 of which the lock has been set is cleared from the administrator information terminal 20, the locking setting unit 43 transmits the list information to the information terminal 20 via the communication network 60. The locking setting unit 43 acquires the locking setting release execution information from the information terminal 20 when the setting of the locking of the fusion splicer 10 has been released. When the locking setting unit 43 acquires the locking setting execution information or the locking setting release execution information from the information terminal 20, the locking setting unit 43 updates information of the management data (database) described above, on the basis of such information.

The locking release unit 44 is a unit that transmits the list information to the information terminal 30 via the communication network 60 when there is a request for acquisition of list information of the fusion splicers of which the locking can be released in order to temporarily release the operation locking of the fusion splicer 10 of which the lock has been set, from the worker information terminal 30. The locking release unit 44 acquires the locking release execution information from the information terminal 30 when a process of releasing the operation locking setting of the fusion splicer 10 is completed on the information terminal 30 side. When the locking release unit 44 acquires the locking release execution information from the information terminal 30, the locking release unit 44 updates the information in the database described above, on the basis of this information. Such updating by the locking setting unit 43 and the locking release unit 44 makes it possible to store or display, as list data, the latest situation (operation lock, temporary release of the operation lock, release of operation locking setting, and the like) of the operation locking of each fusion splicer 10 managed by the administrator, and for the administrator to confirm a lock situation of each fusion splicer 10 under management in real time.

The information storage unit 45 is a unit that stores the various types of information described above (management information, locking setting information, and the like) as a database. The information storage unit 45 provides necessary information to the data registration unit 42, the locking setting unit 43, and the locking release unit 44 in response to the request.

Figure 10:
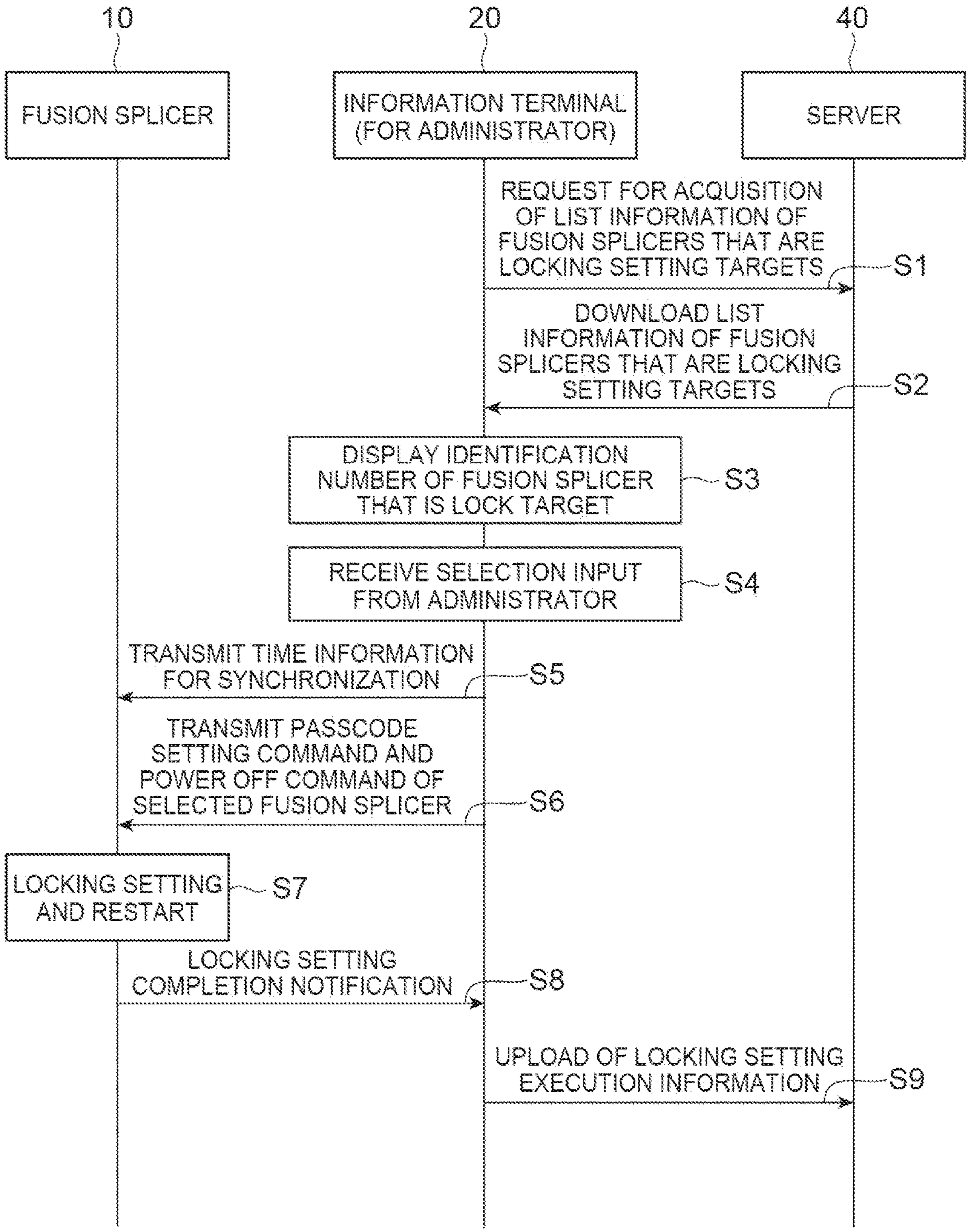
FIG. 10 is a sequence diagram illustrating a process of locking operation of the fusion splicer performed using the administrator information terminal.
Figure 11:
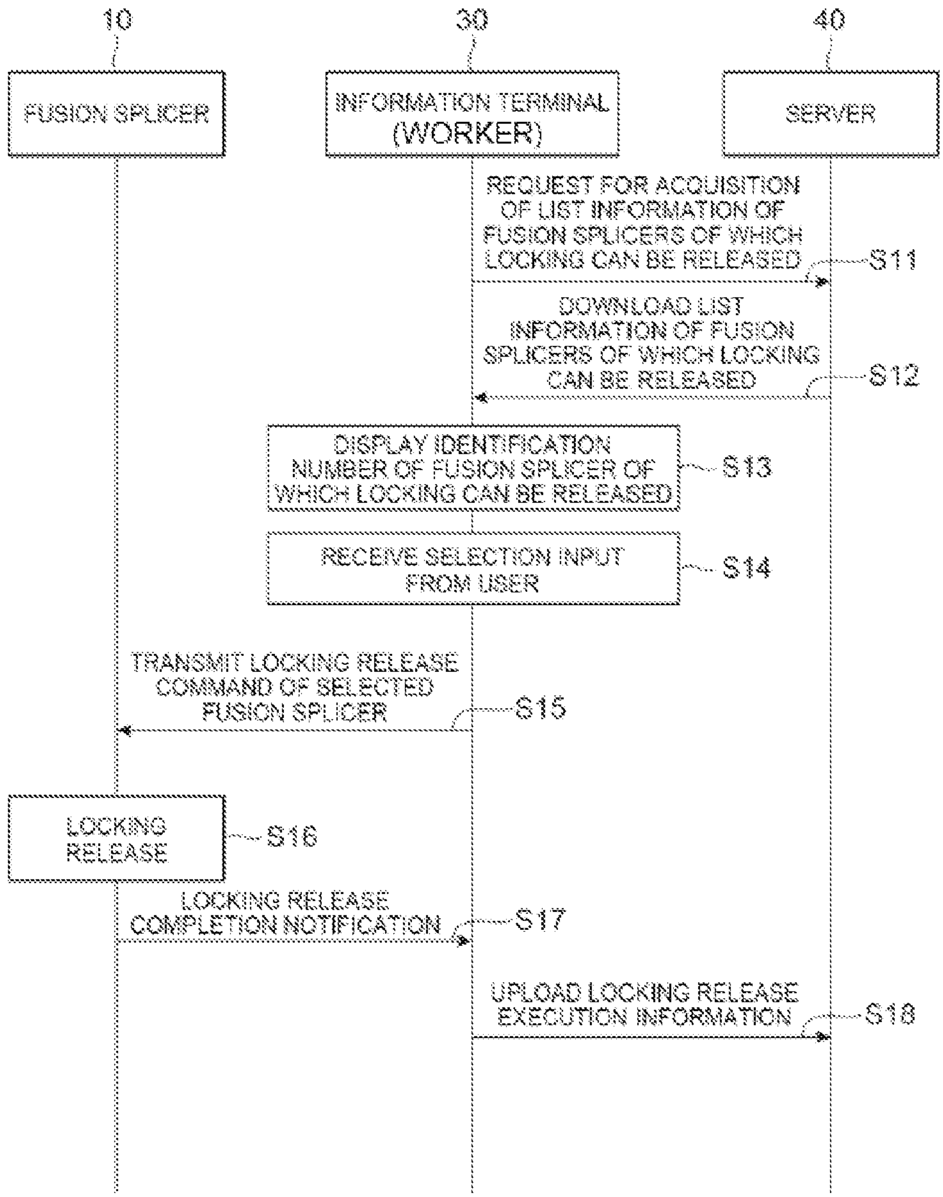
FIG. 11 is a sequence diagram illustrating a process of temporarily releasing an operation locking of the fusion splicer using the worker information terminal.
Figure 12:
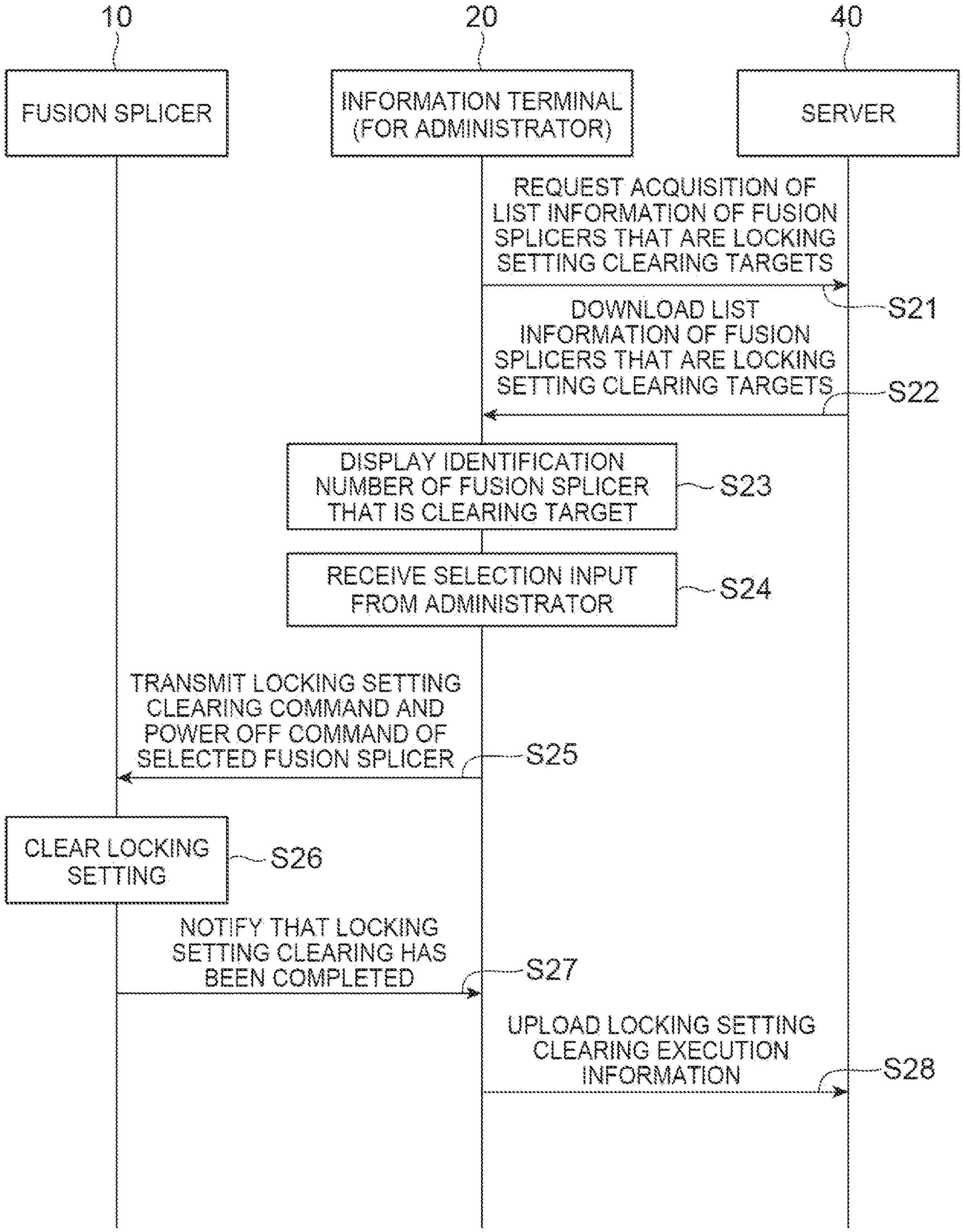
FIG. 12 is a sequence diagram illustrating a process of clearing (releasing) an operation locking setting of the fusion splicer using the administrator information terminal.

Next, the setting of the operation locking of the fusion splicer 10 by the information terminals 20 and 30 and the server 40, temporary release of the locking setting, and a process of clearing the locking setting (operation control method) will be described with reference to FIGS. 10, 11 and 12. FIG. 10 is a sequence diagram illustrating an operation locking process of the fusion splicer 10 performed using the administrator information terminal 20. FIG. 11 is a sequence diagram illustrating a process of temporarily releasing the operation locking of the fusion splicer 10 using the worker information terminal 30. FIG. 12 is a sequence diagram illustrating the operation locking setting clearing process of the fusion splicer 10 that is performed by using the administrator information terminal 20.

As illustrated in FIG. 10, when the setting of the operation locking of the fusion splicer 10 is performed, first, a request for acquisition of list information of the fusion splicers that are locking setting targets managed by the administrator is sent from the information terminal 20 located within a range in which a wireless connection with the fusion splicer 10 is possible, to the server 40 (step S1). The server 40 that has received this acquisition request downloads the list information of the fusion splicers that are locking setting targets to the information terminal 20 (step S2). The information terminal 20 that has acquired the list information displays the identification number of the fusion splicer that is a lock target on the basis of this list information (step S3). In this display, the fusion splicers that are lock targets may be displayed one by one (see FIG. 14), or may be displayed collectively. Thereafter, when the administrator selects a locking setting target, the information terminal 20 receives a relevant input and generates the passcode setting command including information such as the release password or lock cycle included in the list information (step S4).

Subsequently, the information terminal 20 that has generated the passcode setting command transmits the time information of the information terminal 20 to the fusion splicer 10 in order to perform the time synchronization of the fusion splicer 10 (step S5). The fusion splicer 10 that has received the time information of the information terminal 20 synchronizes the internal time on the basis of the time information. Thereafter, the information terminal 20 transmits the passcode setting command and the power OFF command to the fusion splicer 10 selected by the administrator (step S6). The power OFF command is a signal for instructing, for example, restart which is required when the fusion splicer 10 performs the setting of the operation locking according to the passcode setting command. The fusion splicer 10 that has received the passcode setting command and the power OFF command performs a process of setting the release password, the lock cycle, and the like included in the passcode setting command, and performs locking setting of the operation of the fusion splicer 10 (step S7).

Subsequently, the fusion splicer 10 that has completed the locking setting sends completion notification indicating that the locking setting has been completed to the information terminal 20 (step S8). The information terminal 20 that has received the completion notification generates the locking setting execution information (the locking setting execution information) of the fusion splicer 10, including information included in this completion notification or information stored in the information terminal 20. Thereafter, the information terminal 20 uploads the generated the locking setting execution information to the server 40, and the server 40 updates the management data (step S9). The process from steps S1 to S9 described above is performed for all the fusion splicers 10 that require the locking setting. This locking setting may be performed sequentially or collectively. Accordingly, the setting of the operation locking of the fusion splicer 10 is performed by the administrator before the fusion splicer 10 is used at a work site.

Next, as illustrated in FIG. 11, when the setting of the locking of the fusion splicer 10 of which the lock has been set before use is temporarily released, a request for acquisition of the list information on the fusion splicers that can be released by the worker is sent from the worker information terminal 30 located in the range in which a wireless connection with the fusion splicer 10 is possible, to the server 40 (step S11). The fusion splicers that can be released by each worker are set by the administrator in advance. This acquisition request may include, for example, terminal identification information of the information terminal 30, information of the worker to be used, or the like, and may be transmitted. The server 40 that has received this acquisition request downloads the list information of the fusion splicers that are locking setting release targets to the information terminal 30 using this terminal identification information, the worker information, or the like (step S12). The information terminal 30 that has acquired the list information displays the identification number of the fusion splicer that is a locking setting release target on the basis of this list information (step S13). In this display, the fusion splicers that are locking setting release targets may be displayed one by one (see FIG. 15), or may be displayed collectively. Thereafter, when the worker selects a locking setting release target, the information terminal 30 receives the input and generates the locking release command including information such as the release password or use period included in the list information (step S14).

Subsequently, the information terminal 30 that has generated the locking release command transmits the locking release command to the fusion splicer 10 selected by the worker (step S15). The fusion splicer 10 that has received the locking release command collates the release password included in the locking release command with the release password included in the passcode setting command, and temporarily releases the setting of the locking of the fusion splicer 10 when the fusion splicer 10 determines that the passwords match (step S16). This release is temporary, and for example, the release period is set on the basis of information such as the use period included in the locking release command.

Subsequently, the fusion splicer 10 of which the locking release setting has been completed sends a completion notification indicating that the locking release setting has been completed to the information terminal 30 (step S17). The information terminal 30 that has received the completion notification generates the locking setting release execution information (locking release execution information) of the fusion splicer 10, including the information included in this completion notification or the information stored in the information terminal 30. Thereafter, the information terminal 30 uploads the generated locking release execution information to the server 40, and the server 40 updates the management data (step S18). The processes from steps S11 to S18 described above are performed for all the fusion splicers 10 of which the locking setting needs to be released. The release of the locking setting may be performed sequentially, or may be performed collectively. As described above, it is possible to temporarily release the setting of the locking of the fusion splicer 10 of which the lock has been set in advance, and use the fusion splicer 10 at a work site. The fusion splicer 10 of which the locking setting has been temporarily released is subjected to locking setting again after a predetermined use period (one day, one week, or the like) has elapsed.

Next, as illustrated in FIG. 12, when the setting of the locking of the fusion splicer 10 of which the locking has been set is cleared (released), a request for acquisition of the list information of the fusion splicers of which the locking setting can be cleared (released) by the administrator is sent from the administrator information terminal 20 located within the range in which a wireless connection with the fusion splicer 10 is possible, to the server 40 (step S21). The server 40 that has received this acquisition request downloads the list information of the fusion splicers that are locking setting clearing targets to the information terminal 20 (step S22). The information terminal 20 that has acquired the list information displays the identification number of the fusion splicer that is a locking setting clearing target on the basis of this list information (step S23). In this display, the fusion splicers that are locking setting clearing targets may be displayed one by one, or may be displayed collectively. Thereafter, when the locking setting clearing target is selected by the administrator, the information terminal 20 receives the input to generate a locking setting release command including information such as the release password included in the list information (step S24). The information included in the locking setting release command may be information for clearing the setting of the locking of the fusion splicer 10 of which the lock has been set, or may be information that instructs to clear a particular setting, other than the release password.

Subsequently, the information terminal 20 that has generated the locking setting release command transmits the locking setting release command to the fusion splicer 10 selected by the administrator (step S25). In this case, the power OFF command for a setting clearing process may be transmitted together. The fusion splicer 10 that has received the locking setting release command performs a locking setting release process using the release password or the like included in the locking setting release command (step S26). This setting release process may be a collation between release passwords or may be another particular collation process. When the fusion splicer 10 determines that the locking setting clearing process is appropriate, the setting of the locking of the fusion splicer 10 is cleared. This clearing process is intended to completely erase the locking setting once, so that the fusion splicer 10 returns to an initial state. It is possible to perform the setting of the locking of the fusion splicer 10 subjected to the clearing process, by performing the locking setting process illustrated in FIG. 10 again.

Subsequently, the fusion splicer 10 that has completed the locking setting clearing process sends a completion notification indicating that that the locking setting clearing process has been completed to the information terminal 20 (step S27). The information terminal 20 that has received the completion notification generates locking setting clearing execution information (locking setting release execution information) of the fusion splicer 10, including the information included in this completion notification or the information stored in the information terminal 20. Thereafter, the information terminal 20 uploads the generated locking setting release execution information to the server 40, and the server 40 updates the management data (step S28). The processes from steps S21 to S28 described above are performed for all the fusion splicers 10 that require the locking setting clearing process. This locking setting clearing process may be performed sequentially or collectively. As described above, it is possible to clear the setting of the locking of the fusion splicer 10 of which the lock has been set and return to the initial state. When maintenance or the like is performed on the fusion splicer 10, maintenance or the like is performed after the return to such an initial state.

Figure 13:
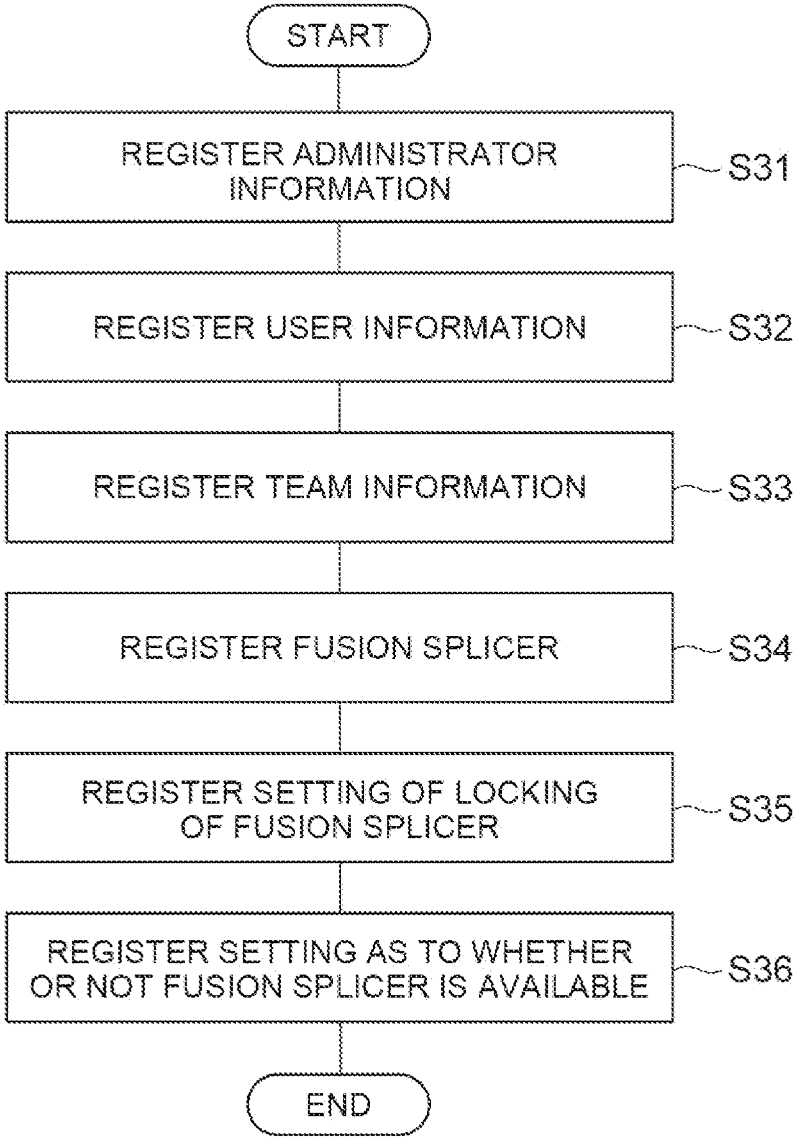
FIG. 13 is a flowchart illustrating a process of registering various types of information for managing and using the fusion splicer in the server.
Figure 16:
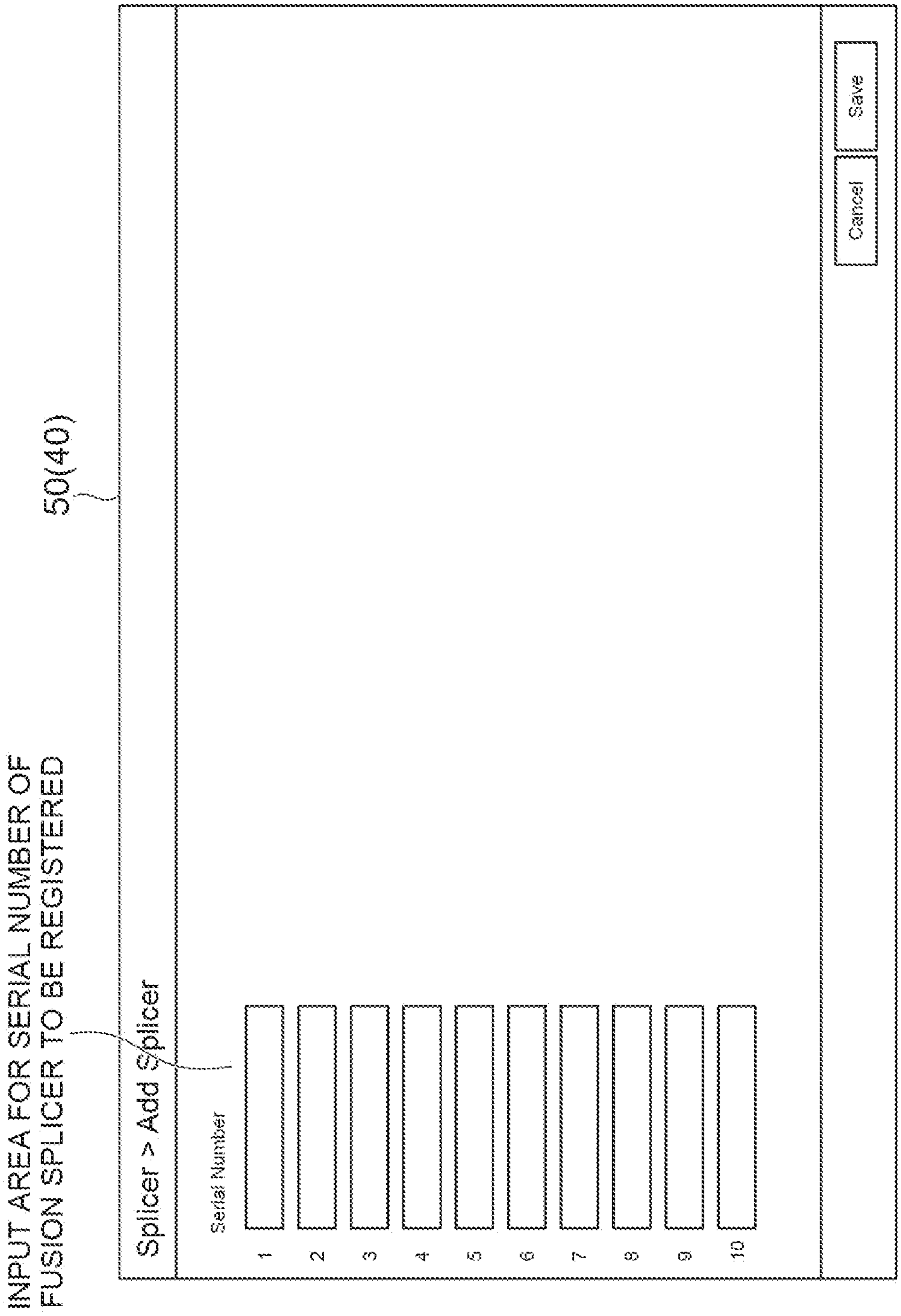
FIG. 16 is a diagram illustrating an example of a registration screen for registering identification numbers (serial numbers) of a plurality of fusion splicers in the server.
Figure 17:
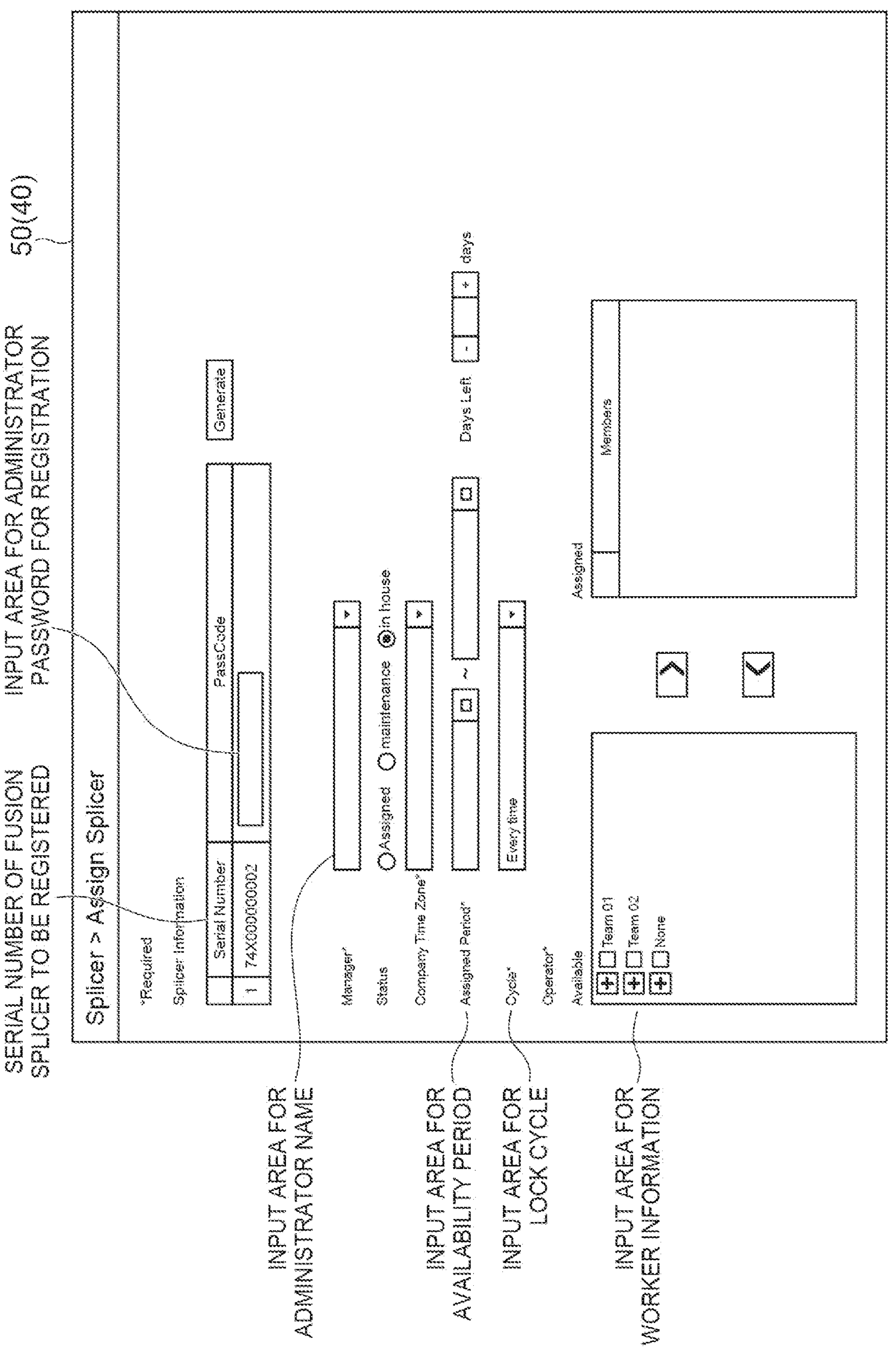
FIG. 17 illustrates an example of a registration screen for registering a release password for locking setting of each fusion splicer, administrator information, time zone, use period, lock cycle, and worker information in the server.

Next, a method of registering information of the administrator, the worker, an operation locking setting process, or the like of the fusion splicer 10 in the server 40 in advance will be described with reference to FIGS. 13, 16, and 17. FIG. 13 is a flowchart illustrating a process of registering various types of information for managing and using the fusion splicer in the server. FIG. 16 is a diagram illustrating an example of a registration screen for registering identification numbers (serial numbers) of a plurality of fusion splicers in the server. FIG. 17 illustrates an example of a registration screen for registering a release password for locking setting of each fusion splicer, administrator information, time zone, use period, lock cycle, and worker information in the server. FIG. 18 is a diagram illustrating an example of management data indicating a relationship among the administrator information, the worker information, and the team information registered in the server in association with one another. FIG. 19 is a diagram illustrating an example of management data in which identification information (serial number) of each fusion splicer, a release password of a locking setting of each fusion splicer, administrator information, time zone, use period, lock cycle, and available worker information registered in the server in association with one another are associated with one another.

As illustrated in FIG. 13, the administrator of the fusion splicer 10 registers the administrator information in the server 40 (step S31). Similarly, the user information, the team information, information of the fusion splicers 10 to be managed, and the like are registered (steps S32, S33, S34). In the registration of the fusion splicers 10, for example, information is stored in the server 40 by inputting the serial number of each fusion splicer 10 on an input screen as illustrated in FIG. 16 and storing (saving) the serial number. The management information registered in steps S31 to S34 includes organization information such as information (a name, telephone number, address, time zone, and the like) on a company that uses or owns the fusion splicers 10 or representative administrator information (a name, e-mail address, administrator account ID/password, and the like), user information such as information (a name, worker account/password, and the like) on a worker who performs work using the fusion splicer 10 or work team information (a team name, users belonging to a team, and the like), and splicer information (a serial number, and the like) of the fusion splicers 10 to be managed.

Subsequently, when basic management information is input, for example, an input screen illustrated in FIG. 17 is displayed to request the administrator to input information such as the release password, administrator, time zone (reference time), use period, lock cycle, and worker for each fusion splicer 10. These pieces of information are input and stored so that the locking setting information of each fusion splicer 10 is stored in the server 40. Thereafter, a setting is made as to whether or not the fusion splicer 10 is available (step S36). When the fusion splicer 10 is not available, a process of prohibiting transmission of the locking release command from an information terminal such as the worker information terminal 30 to the fusion splicer 10 is performed, and the use of the fusion splicer 10 is disabled. On the other hand, when the fusion splicer 10 is available, the use of the fusion splicer 10 is enabled. As described above, when the processes from step S31 to step S36 are performed, the management data in which a relationship among the administrator, the worker, and the team, and the like are associated, as illustrated in FIG. 18, is generated and managed in the server 40. Further, related information (the release password, administrator, time zone, use period, lock cycle, available user name, and the like) for the locking setting of the fusion splicer associated with the serial number of each fusion splicer, as illustrated in FIG. 19, is generated and managed in the server 40. Such information is provided from the server 40 to the information terminals 20 and 30, or the like and is used for each process such as the setting of the operation locking of the fusion splicer 10 or temporary release/setting clearing described above, and when each process ends, a necessary update process is performed.

As described above, according to the fusion splicing system according to the present embodiment, the locking of the operation of the fusion mechanism of the fusion splicer 10 is set before use, and the locking setting is released so that the fusion splicer 10 is available according to the locking release command from the information terminal 30 used by the worker. That is, in this fusion splicing system 1, the fusion splicer 10 is in an operation-locked state from the beginning, and the operation lock is released temporarily (during a predetermined period) by the information terminal 30 at the time of use, and then is used. Moreover, the information terminal 30 receives the locking release information (the release password) that is used for locking release from the server 40. Therefore, even when the fusion splicer 10 is stolen, the fusion splicer 10 is not available with the fusion splicer 10 locked unless there is no connection to the server 40 or there is no information terminal 30, and as a result, the theft of the fusion splicer is curbed. The release password may be acquired from the server 40 each time the information terminal 30 releases the lock, or several release passwords may be stored in the information terminal 30 in advance in order to prepare for a case in which a radio wave state is poor. In this case, it is possible to perform work for several days even at a work site where a radio wave situation is poor, and work efficiency is not hindered.

In the present embodiment, the information terminal 30 may transmit a request for acquisition of the locking release information (release password) to the server 40 together with at least one of the identification information of the information terminal 30 and worker information of the information terminal 30, and the server 40 transmits, to the information terminal 30, the locking release information (the release password) corresponding to the identification information or user information included in the acquisition request received from the information terminal 30. In this case, since the server 40 can manage the locking release information for releasing the operation locking of the fusion splicer 10, it is possible to further curb theft of the fusion splicer. Further, it is possible to provide the required release password only to the appropriate information terminal 30.

In the present embodiment, when the information terminal 30 acquires the locking release information from the server 40, the information terminal 30 does not display release password information for locking release included in the locking release information, and displays identification information of the fusion splicer 10 associated with the locking release information on the information terminal. In this case, even when the information terminal 30 is, for example, stolen and used, a thief cannot easily know the release password information for locking release of the locked fusion splicer 10, the locking cannot be released once the fusion splicer 10 is locked after a predetermined period of time, and it is possible to further curb theft of the fusion splicer 10.

The present embodiment further includes an information terminal 20 for transmitting the passcode setting command (locking setting command signal) including lock information for locking setting of the operation of the fusion splicer 10 to the fusion splicer 10. The information terminal 20 is an administrator information terminal, and acquires information for performing locking setting from the server 40. In this case, since the administrator of the fusion splicer 10 can perform operation locking setting of the fusion splicer 10 using the information terminal 20 different from the information terminal 30 used by the worker, it becomes easier to manage the prevention of theft of the fusion splicer.

In the present embodiment, the information terminal 20 also transmits the time information of the information terminal 20 when transmitting the passcode setting command to the fusion splicer 10. In this case, it is possible to synchronize the time of the fusion splicer 10 with the time of the information terminal 20 used by the administrator, and make it easier for the administrator to manage the time of the fusion splicer 10 more reliably.

In the present embodiment, the lock information included in the passcode setting command includes the release password information for releasing the setting of the operation locking of the fusion splicer. Further, the lock information further includes at least one of lock start date information for setting start of the operation locking of the fusion splicer and lock cycle information for continuity of the setting of the operation locking of the fusion splicer. This makes it possible to control the setting of the operation locking of the fusion splicer more finely.

In the present embodiment, when the information terminal 20 receives, from the fusion splicer 10, the completion notification indicating that the setting of the operation locking of the fusion mechanism has been completed after transmitting the passcode setting command to the fusion splicer 10, the information terminal 20 transmits the locking setting execution information in the fusion splicer 10 to the server 40. The server 40 stores the locking setting execution information in the storage unit. The locking setting execution information includes at least one of the identification number of the information terminal 20 that has performed the locking of the fusion splicer, user information of the information terminal 20, locking setting execution date and time information, locking setting execution position information, and locking setting execution result information. This makes it possible for the server 40 to centrally manage information on the setting of the operation locking of the fusion splicer and makes the management of the fusion splicer 10 by the administrator more reliable.

In the present embodiment, the information terminal 20 acquires locking setting release information for clearing the setting of the locking of the fusion splicer 10 according to the passcode setting command from the server 40, and transmits a locking setting release command including the locking setting release information to the fusion splicer 10. In this case, when the fusion splicer 10 is, for example, maintained, it is possible to collectively release the setting of the operation locking of the fusion splicer 10.

In the present embodiment, when the information terminal 20 receives, from the fusion splicer 10, the completion notification indicating that the operation locking setting of the fusion mechanism has been cleared after transmitting the locking setting release command to the fusion splicer 10, the information terminal 20 transmits the locking setting release execution information in which the locking setting in the fusion splicer 10 has been cleared, to the server 40. This makes it possible for the server 40 to centrally manage release information for clearing the setting of the operation locking of each fusion splicer 10, and makes the management of the fusion splicer 10 by the administrator more reliable.

In the present embodiment, the locking release information transmitted from the server 40 to the information terminal 30 includes use period information in which the operation of the fusion mechanism is temporarily performed. This makes it easier to adjust the use period in which the setting of the operation locking of the fusion splicer 10 is released.

In the present embodiment, when the information terminal 30 has received, from the fusion splicer 10, a completion notification indicating that the temporary release of the setting of the operation locking of the fusion splicer has been completed after transmitting the locking release command to the fusion splicer 10, the information terminal 30 transmits the locking release execution information in the fusion splicer 10 to the server 40. The locking release execution information includes at least one of the identification number of the information terminal 30 that has performed the temporary locking release of the fusion splicer 10, user information of the information terminal 30, locking release execution date and time information, locking release execution position information, and locking release result information. This makes it possible for the server 40 to centrally manage release information for the setting of the operation locking of each fusion splicer 10, and makes the management of the fusion splicers 10 by the administrator more reliable.

In the present embodiment, the server 40 includes a storage unit in which at least two of the release password information included in the lock information for setting the locking of the operation of the fusion splicer 10, the user information of the information terminal 30, the user information of the information terminal 20, time information of the fusion splicer 10, use period information in which the setting of the locking of the fusion splicer 10 is temporarily released, and lock cycle information in which the temporarily released fusion splicer 10 is put into a locked state again, are stored in association with each other. This makes it possible for the server 40 to centrally manage the operation locking setting of each fusion splicer 10, the release of the operation locking setting of each fusion splicer 10, and the clearing process of each fusion splicer 10, and makes management (prevention of theft, and the like) of the fusion splicers 10 by the administrator more reliable.

The fusion splicing system, the fusion splicing device, the information terminal, the server, the operation control method for a fusion splicer, and the like according to the present embodiment have been described above, but the present invention is not limited thereto, and various modifications can be applied.

REFERENCE SIGNS LIST

1: Fusion splicing system
2: Housing
3: Fusion unit (fusion mechanism)
3*a*: Optical fiber holder
3*b*: Fiber positioning portion
3*c*: Discharge electrode
4: Heater (fusion mechanism)
5: Monitor
6: Windshield cover
6*a*: Side surface
6*b*: Introduction port
10: Fusion splicer
11: Communication unit
12: Time synchronization processing unit
13: Locking setting unit
14: Locking release unit
15: Information storage unit
20: Information terminal (second information terminal)
21: Communication unit
22: Time synchronization instruction unit
23: Locking setting unit
24: Position acquisition unit
25: Locking setting clearing unit
26: Information storage unit
30: Information terminal (first information terminal)
31: Communication unit
32: Locking release unit
33: Position acquisition unit
34: Information storage unit
40: Server
41: Communication unit
42: Data registration unit
43: Locking setting unit
44: Locking release unit
45: Information storage unit
50: Information terminal
60: Communication network

What is claimed is:

1. A fusion splicing system comprising:

a fusion splicer including a fusion mechanism configured to fusion-splice optical fibers, and a controller configured to control an operation of the fusion mechanism, the fusion splicer being configured to communicate with an external device;

a first information terminal configured to communicate with the fusion splicer; and a server configured to communicate with the first information terminal, wherein the controller is configured to perform locking setting on an operation of the fusion mechanism before use, wherein the first information terminal acquires locking release information to temporarily release the locking setting from the server, and transmits a locking release command signal including the locking release information to the fusion splicer, and wherein the controller determines whether or not the locking release information included in the received locking release command signal is appropriate, and temporarily releases the locking setting on the fusion mechanism so as to enable the fusion mechanism when the locking release information is appropriate, wherein the locking release information transmitted from the server to the first information terminal includes use period information in which the operation of the fusion mechanism can be temporarily performed, and wherein a period in which the locking setting is released is the period in which a worker can use the fusion splicer, and after the period elapses, a locking release of the fusion splicer is invalidated, and the operation of the fusion mechanism is locked again.

2. The fusion splicing system according to claim 1, wherein the first information terminal transmits a request for acquisition of the locking release information to the server together with at least one of terminal identification information of the first information terminal and user information of the first information terminal, and wherein the server transmits, to the first information terminal, the locking release information corresponding to the terminal identification information or the user information included in the request for acquisition received from the first information terminal.

3. The fusion splicing system according to claim 1, wherein, when the first information terminal acquires the locking release information from the server, the first information terminal does not display release password information to release the locking included in the locking release information, and displays splicer identification information of the fusion splicer associated with the locking release information.

4. The fusion splicing system according to claim 1, further comprising:

a second information terminal configured to transmit a locking setting command signal including lock information to set locking on an operation of the fusion splicer, to the fusion splicer, wherein the second information terminal acquires the lock information from the server.

5. The fusion splicing system according to claim 4, wherein, when the second information terminal transmits the locking setting command signal to the fusion splicer, the second information terminal transmits time information of the second information terminal.

6. The fusion splicing system according to claim 4, wherein the lock information includes release password information to release the locking setting of the operation of the fusion splicer.

7. The fusion splicing system according to claim 6, wherein the lock information further includes at least one of locking start date information to start to set locking on the operation of the fusion splicer, and lock cycle information for continuity of the locking setting on the operation of the fusion splicer.

8. The fusion splicing system according to claim 4, wherein, when the second information terminal receives, from the fusion splicer, a completion notification indicating that locking setting on the operation of the fusion mechanism has been completed after transmitting the locking setting command signal to the fusion splicer, the second information terminal transmits locking setting execution information in the fusion splicer, to the server, and wherein the server stores the locking setting execution information in a storage.

9. The fusion splicing system according to claim 8, wherein the locking setting execution information includes at least one of an identification number of the second information terminal that has set locking on the fusion splicer, user information of the second information terminal, locking setting execution date and time information, locking setting execution position information, and locking setting execution result information.

10. The fusion splicing system according to claim 4, wherein the second information terminal acquires locking setting release information that clears the locking setting on the fusion splicer according to the locking setting command signal from the server, and transmits a locking setting release command signal including the locking setting release information to the fusion splicer.

11. The fusion splicing system according to claim 10, wherein, when the second information terminal receives, from the fusion splicer, a completion notification indicating that the locking setting on the operation of the fusion mechanism has been cleared, after transmitting the locking setting release command signal to the fusion splicer, the second information terminal transmits locking setting release execution information indicating that the locking setting on the fusion splicer has been cleared, to the server.

12. The fusion splicing system according to claim 1, wherein, when the first information terminal has received, from the fusion splicer, a completion notification indicating that temporary release of the locking setting on the operation of the fusion mechanism has been completed after transmitting the locking release command signal to the fusion splicer, the first information terminal transmits the locking release execution information in the fusion splicer, to the server.

13. The fusion splicing system according to claim 12, wherein the locking release execution information includes at least one of an identification number of the first information terminal that has temporary released the locking on the fusion splicer, user information of the first information terminal, locking release execution date and time information, locking release execution position information, and locking release result information.

14. The fusion splicing system according to claim 1, wherein the server includes a storage, at least two of release password information included in lock information that sets locking on the operation of the fusion splicer,
user information of the first information terminal,
user information of the second information terminal,
time information of the fusion splicer,
use period information in which the locking setting of the fusion splicer is temporarily released, and
lock cycle information to put the fusion splicer of which locking setting has been temporarily released into a locked state again,
are stored in association with each other in the storage.

15. The fusion splicing system according to claim 1, wherein the controller comprises a locking setting unit configured to perform the locking setting and a locking releasing unit configured to release the locking setting.

16. An operation control method for controlling an operation of a fusion splicer including a fusion mechanism configured to fusion-splice optical fibers, and a controller configured to control an operation of the fusion mechanism wherein the fusion splicer is configured to communicate with an external device, by a first information terminal configured to communicate with the fusion splicer, the operation control method comprising:
acquiring, with the first information terminal, locking release information to release a locking setting on the fusion splicer, the locking setting on an operation of the fusion mechanism being set in the fusion splicer, from a server;
transmitting, with the first information terminal, a locking release command signal including the locking release information acquired from the server, to the fusion splicer; and
determining, with the controller, whether or not the locking release information included in the received locking release command signal is appropriate,
wherein the locking setting by the controller is released and the fusion mechanism is temporarily enabled when the locking release information is determined to be appropriate in the determining,
wherein the locking release information transmitted from the server to the first information terminal includes use period information in which the operation of the fusion mechanism can be temporarily performed, and
wherein a period in which the locking setting is released is the period in which a worker can use the fusion splicer, and after the period elapses, a locking release of the fusion splicer is invalidated, and the operation of the fusion mechanism is locked again.

17. The operation control method for the fusion splicer according to claim 16, further comprising:
transmitting a locking setting command signal including lock information to set locking on the operation of the fusion mechanism of the fusion splicer from the second information terminal to the fusion splicer; and
setting, with the controller, the locking on the operation of the fusion mechanism on the basis of the lock information included in the received locking setting command signal.

18. A server comprising:
a storage configured to store identification information of a plurality of fusion splicers, locking release information to release locking setting on an operation of each of the plurality of fusion splicers, and information on a worker who is able to request release of the locking setting on each of the plurality of fusion splicers in association with one another;
a communication unit configured to receive, from an external information terminal, a request for acquisition of locking release information of at least one of the plurality of fusion splicers; and
a determination unit configured to determine whether or not the worker information included in the received acquisition request matches the worker information associated with the fusion splicer for which the locking release information stored in the storage is requested,
wherein, when the determination unit determines that the worker information included in the received acquisition request matches the stored worker information, the communication unit transmits locking release information associated with the fusion splicer to the external information terminal,
wherein the locking release information transmitted from the server to the first information terminal includes use period information in which the operation of each of the plurality of fusion splicers can be temporarily performed, and
wherein a period in which the locking setting is released is the period in which a worker can use the fusion splicer, and after the period elapses, a locking release of the fusion splicer is invalidated, and the operation of each of the plurality of fusion splicers is locked again.

19. The server according to claim 18, wherein the storage stores lock cycle information at which locking on the operation of each of the plurality of fusion splicers is set, and period information of a use period in which the locking setting is temporarily released so that the fusion splicer is available, in association with the identification information.

* * * * *